United States Patent
Berzin et al.

(10) Patent No.: US 11,589,255 B2
(45) Date of Patent: Feb. 21, 2023

(54) APPLICATION WORKLOAD ROUTING AND INTERWORKING FOR NETWORK DEFINED EDGE ROUTING

(71) Applicant: Equinix, Inc., Redwood City, CA (US)

(72) Inventors: Oleg Berzin, Huntingdon Valley, PA (US); Robert J. Huey, Pleasanton, CA (US)

(73) Assignee: Equinix, Inc., Redwood City, CA (US)

( * ) Notice: Subject to any disclaimer, the term of this patent is extended or adjusted under 35 U.S.C. 154(b) by 0 days.

(21) Appl. No.: 17/139,857

(22) Filed: Dec. 31, 2020

(65) Prior Publication Data
US 2021/0297891 A1 Sep. 23, 2021

Related U.S. Application Data

(63) Continuation-in-part of application No. 16/949,063, filed on Oct. 12, 2020, now Pat. No. 11,304,115.

(60) Provisional application No. 62/991,451, filed on Mar. 18, 2020.

(51) Int. Cl.
| | |
|---|---|
| H04W 40/04 | (2009.01) |
| H04W 28/02 | (2009.01) |
| H04L 45/02 | (2022.01) |
| H04L 45/50 | (2022.01) |
| H04W 40/02 | (2009.01) |
| H04W 36/22 | (2009.01) |
| H04W 40/32 | (2009.01) |

(52) U.S. Cl.
CPC ........ *H04W 28/0263* (2013.01); *H04L 45/04* (2013.01); *H04L 45/507* (2013.01); *H04W 28/0273* (2013.01); *H04W 36/22* (2013.01); *H04W 40/02* (2013.01)

(58) Field of Classification Search
CPC . H04W 40/04; H04W 28/0268; H04W 40/12; H04W 40/32; H04L 45/123; H04L 45/124; H04L 45/20; H04L 45/306; H04L 45/30
See application file for complete search history.

(56) References Cited

U.S. PATENT DOCUMENTS

| | | | |
|---|---|---|---|
| 9,450,817 B1 * | 9/2016 | Bahadur | ............. H04L 41/0895 |
| 9,886,267 B2 | 2/2018 | Maheshwari et al. | |
| 9,948,552 B2 | 4/2018 | Teng et al. | |
| 10,015,268 B2 | 7/2018 | Rao | |

(Continued)

FOREIGN PATENT DOCUMENTS

EP 2418802 A1 2/2012

OTHER PUBLICATIONS

Le Faucheur et al., "Use of Interior Gateway Protocol (IGP) Metric as a second MPLS Traffic Engineering (TE) Metric," Network Working Group, RFC 3785, May 2004, 8 pp.

(Continued)

*Primary Examiner* — Eunsook Choi
(74) *Attorney, Agent, or Firm* — Shumaker & Sieffert, P.A.

(57) ABSTRACT

Techniques are described for a network providing application workload routing and application workload interworking. For example, a controller may move or replicate an application workload hosted on an original edge compute to a different edge compute in a different edge data center that is locally accessible by the device and route the network traffic to the new edge compute using paths mapped to respective traffic classes.

20 Claims, 11 Drawing Sheets

(56) References Cited

U.S. PATENT DOCUMENTS

| | | | |
|---|---|---|---|
| 10,659,362 B1* | 5/2020 | Sellappa | H04L 45/74591 |
| 10,660,003 B2* | 5/2020 | Wei | H04W 36/12 |
| 2003/0202469 A1 | 10/2003 | Cain | |
| 2012/0071168 A1* | 3/2012 | Tomici | H04W 76/15 |
| | | | 455/445 |
| 2012/0224506 A1 | 9/2012 | Gredler et al. | |
| 2013/0135992 A1 | 5/2013 | Callejo Rodriguez et al. | |
| 2016/0212016 A1* | 7/2016 | Vrzic | H04L 45/306 |
| 2017/0346720 A1 | 11/2017 | Lazzeri et al. | |
| 2019/0230032 A1* | 7/2019 | Landau | H04L 45/08 |
| 2019/0238451 A1 | 8/2019 | Fujsawa et al. | |
| 2019/0261260 A1* | 8/2019 | Dao | H04W 36/0011 |
| 2020/0162371 A1* | 5/2020 | Musku | H04L 45/54 |
| 2020/0296012 A1* | 9/2020 | Paruchuri | H04L 43/0835 |
| 2020/0296029 A1* | 9/2020 | Shenoy | H04L 41/12 |
| 2020/0382387 A1* | 12/2020 | Pasupathy | H04L 41/40 |
| 2021/0067468 A1* | 3/2021 | Cidon | H04L 41/0813 |
| 2021/0127351 A1* | 4/2021 | Stojanovski | H04W 48/16 |

OTHER PUBLICATIONS

Previdi et al., "IS-IS Traffic Engineering (TE) Metric Extensions," Internet Engineering Task Force (IETF), RFC 7810, May 2016,18 pp.

U.S. Appl. No. 16/949,063, filed Oct. 12, 2020, naming inventors Berzin et al.

"Segment Routing," Cisco Systems, Inc , Retrieved Apr. 27, 2021 from: https://web.archive.org/web/20200123094639/http://www.segment-routing.net/, Jan. 23, 2020, 3 pp.

"Study on management and orchestration of network slicing for next generation network," 3rd Generation Partnership Project; Technical Specification Group Services and System Aspects; Telecommunication management; TR 28.801, v15.1.0, Release 15, Jan. 2018, 79 pp.

"System Architecture for the 5G System," 3rd Generation Partnership Project; Technical Specification Group Services and System Aspects; System architecture for the 5G System(5GS); TS23.501, v16.3.0, Release 16, Dec. 2019, 417 pp.

"Kubernetes," The Linux Foundation, Retrieved May 13, 2021 from; https://web.archive.org/web/20200122201830/https://kubernetes.io/, Jan. 22, 2020, 10 pp.

"Multi-access Edge Computing (MEC); Framework and Reference Architecture," ETSI GS MEC 003: V2.1.1, Jan. 2019, 21 pp.

Kekki et al., "MEC in 5G networks," ETSI White Paper No. 28, Jun. 2018, 28 pp.

"Driving Data to the Edge: The Challenge of Traffic Distribution," AECC Technical Report, Automotive Edge Computing Consortium (AECC), Technical Solution Working Group (WG2), Sep. 19, 2019, 48 pp.

Matsushima et al., "Segment Routing IPv6 for Mobile User Plane: draft-ietf-dmm-srv6-mobile-uplane-07," DMM Working Group, Internet-Draft, Nov. 4, 2019, 29 pp.

Filsfils, "SRv6," Cisco Systems, Inc., Retrieved May 13, 2021 from: https://web.archive.org/web/20200117171116/https://www.segment-routing.net/tutorials/2017-12-05-srv6-introduction/, Dec. 5, 2017, 79 pp.

Filsfils et al., "IPv6 Segment Routing Header (SRH): draft-ietf-6man-segment-routing-header-26," Network Working Group, Internet-Draft, Oct. 22, 2019, 32 pp.

Berzin, "Mobility Management Architecture and Modeling for Label Switched Networks (Mobility Label Based Network)," Ph.D. Thesis, Retrieved from: https://idea.library.drexel.edu/islandora/object/idea%3A3217, Mar. 2010, 238 pp.

International Search Report and Written Opinion of International Application No. PCT/US2020/067746, dated Apr. 16, 2021, 13 pp.

Filsfils et al., "Segment Routing Architecture," Internet Engineering Task Force (IETF), RFC 8402, Jul. 2018, 33 pp.

Filsfils et al., "Segment Routing Use Cases: draft-filsfils-spring-segment-routing-use-cases-01," Network Working Group, Internet-Draft, Oct. 21, 2014, 35 pp.

Notice of Allowance from U.S. Appl. No. 16/949,063, dated Dec. 8, 2021, 7 pp.

Response to Communication Pursuant to Rules 161(1) and 162 EPC dated Jan. 14, 2022, from counterpart European Application No. 20845354.8, filed Jul. 8, 2022, 11 pp.

First Examination Report from counterpart Australian Patent Application No. 202043737 dated Sep. 20, 2022, 2 pp.

International Preliminary Report on Patentability from International Application No. PCT/US2020/067746 dated Sep. 29, 2022, 9 pp.

Response to First Examination Report dated Sep. 20, 2022 from counterpart Australian Application No. 2020437137 filed Oct. 24, 2022, 6 pp.

\* cited by examiner

APPLICATION WORKLOAD ROUTING AND INTERWORKING FOR NETWORK DEFINED EDGE ROUTING

CROSS REFERENCE

This application claims the benefit of U.S. application Ser. No. 16/949,063, filed on Oct. 12, 2020 and U.S. Provisional Patent Application No. 62/991,451, filed on Mar. 18, 2020, the entire contents of which are incorporated by reference herein in their entirety.

TECHNICAL FIELD

The disclosure relates to computer networks and, more specifically, to engineering traffic flows within computer networks.

BACKGROUND

Networks may implement $5^{th}$ Generation (5G) standards to enable network capabilities that improve network characteristics such as latency, capacity, throughput and reliability. 5G networks include two parts, a 5G New Radio (5GNR) and a 5G core (5GC). 5GNR defines an air interface structure, antennae design (e.g., massive Multiple Input Multiple Output arrays (mMIMO)) and radio transmission methods (beamforming/beam steering). 5GNR increases data rates, decreases "air interface" latency, and improves capacity (e.g., number of connected devices). 5GC defines core control (signaling) and user plane (data) capabilities that make use of cloud native virtualization and enable features such as Control and User Plane Separation (CUPS) and network slicing.

5G networks provide significantly higher throughput than existing networks, such as $4^{th}$ generation of mobile networks ("4G") and 4G Long Term Evolution ("LTE"). Currently, 4G LTE is limited to around 150 Megabits per second (Mbps). LTE Advanced increases the data rate to 300 Mbps and LTE Advanced Pro to 600 Mbps-1 Gigabits per second (Gbps). In 5G networks, the downlink speeds may be up to 20 Gbps. 5G networks can use multiple spectrum options, including low band (sub 1 Giga Hertz (GHz)), mid-band (1-6 GHz), and mmWave (28, 39 GHz). The mmWave spectrum has the largest available contiguous bandwidth capacity (~1000 MHz). 5G networks enable advanced air interface formats and transmission scheduling procedures that decrease access latency in the Radio Access Network (RAN), such as by a factor of 10 compared to 4G LTE.

However, to achieve the improvements in key network characteristics (e.g., latency, capacity, throughput and reliability), improvements to the physical and logical infrastructure (e.g., RAN, edge data centers, packet/optical interconnection fabric, edge computing) are needed to enable the ability to deliver high-performing services on the 5G network.

SUMMARY

In general, techniques are described for a network providing network defined edge routing for an application workload. The network may implement 5G standards to deliver traffic with, for example, very low end-to-end latency. To enable the delivery of traffic in accordance with 5G standards, the network may include a physical aggregation infrastructure having a set of interconnected edge data centers (EDCs) that enable the infrastructure for physical aggregation points and for the delivery of one or more 5G capabilities (e.g., very low end-to-end latency). For example, the set of interconnected EDCs may implement 5G Radio Access Network (RAN) functions (e.g., Base Band Unit (BBU), Distributed Unit (DU), Centralized Unit (CU)), 5G Core (5GC) functions (e.g., User Plane Function (UPF)), and edge computing functions (also referred to herein as "edge compute (EC)" or "Mobile Edge Compute (MEC)").

Traffic may be routed from a Radio Access Network to a data network (e.g., via a mobile breakout point) and terminated on an application workload (e.g., Kubernetes container) that runs a corresponding application or service instance(s) within the data network. To reduce latency, an ideal physical location for the application workload is locally within a mobile edge compute infrastructure in the same edge data center that hosts RAN/5GC functions that services the mobile session providing connectivity for the traffic. In some instances, not all edge data centers are equipped with RAN functions, capable of accepting wireless connections from devices, and/or equipped with edge computing functions (e.g., some EDCs could be smaller Centralized RAN hubs without edge compute servers). In accordance with techniques described in this disclosure, the network provides network defined edge routing via a set of interconnected edge data centers to route traffic from an application workload in accordance with low-latency standards, such as 5G standards. A set of interconnected edge data centers may be configured as part of a single domain, referred to herein as an "MEC domain (MECD)" in which at least one edge data center in the MEC domain is equipped with edge compute resources. As one example, the network utilizes segment routing (SR) as a mechanism of end-to-end path identification and traffic forwarding within the MEC domain, coupled with methods of element-aware segment identification registration, identification and interworking between the 5G control plane, and optimized edge routing control.

In one example, techniques described herein may provide for a controller for the network that discovers the topology of the MEC domain and computes paths within the MEC domain that meet traffic class requirements as well as perform traffic engineering using segment routing mechanisms (e.g., Source Packet Routing in Networking (SPRING)). In the one or more examples described in this disclosure, the controller may receive registration information (referred to herein as "element registration information") of elements/modules hosted on edge data centers of the MEC domain that provide, for example, one or more RAN functions (DU/CU), one or more 5G core functions, and/or one or more edge compute functions, and element registration information of network devices (e.g., routers) that interconnect the modules in the network. Using the element registration information, and link and network fabric path information based on routing metrics (e.g., latency) between the packet and optical domains, the controller may compute paths (e.g., segment routing label stacks) mapped to respective traffic classes to route traffic within the MEC domain of the network. In this way, traffic is routed along a path from the device to the application workload hosted by an edge compute based on traffic class requirements of a corresponding application for the application workload.

In some examples, devices may perform inter-centralized unit handover, e.g., handover from radio cells aggregated at a given EDC to radio cells aggregated at another EDC. After an inter-centralized unit handover, the application workload is typically still anchored at the original EDC and network traffic is still routed to the original EDC. The additional network distance to route network traffic to the original EDC may result in added latency, which may cause applications associated with a low latency class to perform incorrectly or experience degraded performance.

In accordance with the techniques described herein, the controller may move or replicate the application workload hosted on an original edge compute to a different edge compute in a different edge data center that is locally accessible by the device and route the network traffic to the new edge compute using paths mapped to respective traffic classes within the MEC domain of the network. This is referred to herein as "application workload routing."

Moreover, in accordance with the techniques described herein, the controller may route traffic from mobile devices operating on networks from different mobile providers to access a common application workload. For example, mobile devices operating on networks from different mobile providers may make use of common edge compute resources to coordinate application processing for applications that require sharing of information across multiple network providers. The controller may compute paths mapped to respective traffic classes within the MEC domain of the network to route traffic to the common edge compute resources. This is referred to herein as "application workload interworking."

In one example, the techniques disclosed herein describe a method comprising: in response to determining that a device is performing or is to perform handover from a first edge data center to a second edge data center, instructing, by a controller of a network, the first edge data center to replicate or move an application workload hosted on the first edge data center to a second edge data center; computing, by the controller and based on (1) element registration information for modules hosted on a set of interconnected edge data centers including the first edge data center and the second edge data center, (2) one or more network devices that interconnect the modules in the network, and (3) one or more routing metrics of the network, a path mapped to a traffic class to route traffic between the device and the second edge data center hosting the application workload via one or more modules hosted on the second edge data center; and sending, by the controller, the path to the second edge data center to cause the second edge data center to route traffic for the application workload according to the path mapped to the traffic class.

In another example, the techniques disclosed herein describe a controller for a network, comprising: one or more processors operably coupled to memory, wherein the one or more processors are configured to: instruct, in response to determining that a device is performing or is to perform handover from a first edge data center to a second edge data center, the first edge data center to replicate or move an application workload hosted on the first edge data center to the second edge data center, compute, based on: (1) element registration information for modules hosted on a set of interconnected edge data centers including the first edge data center and the second edge data center, (2) one or more network devices that interconnect the modules in the network, and (3) one or more routing metrics of the network, a path mapped to a traffic class to route traffic between the device and the second edge data center hosting the application workload via one or more modules hosted on the second edge data center; and send the path to the second edge data center to cause the second edge data center to route traffic for the application workload according to the path mapped to the traffic class.

In another example, the techniques disclosed herein describe a method comprising: receiving, by a controller of a network, a first request to route traffic between a first device and an edge computing function hosting an application workload via a first edge data center, and a second request to route traffic between a second device and the edge computing function via a second edge data center; wherein the first edge data center and the second edge data center are each provided by different mobile network providers, wherein a third edge data center hosting the application workload is provided by a common application provider to the different mobile network providers; computing, by the controller and based on: (1) element registration information for modules hosted on a set of interconnected edge data centers including the first edge data center, the second edge data center, and the third edge data center (2) one or more network devices that interconnect the modules in the network, and (3) one or more routing metrics of the network, a first path mapped to a traffic class to route traffic between the first device and the edge computing function hosting the application workload via one or more of the modules hosted on the first edge data center, and a second path mapped to the traffic class to route traffic between the second device and the edge computing function hosting the application workload via one or more of the modules hosted on the second edge data center; sending, by the controller, the first path to the first edge data center to cause the first edge data center to route traffic for the application workload according to the first path mapped to the traffic class; and sending, by the controller, the second path to the second edge data center to cause the second edge data center to route traffic for the application workload according to the second path mapped to the traffic class.

The details of one or more examples of the techniques are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Figure 1:
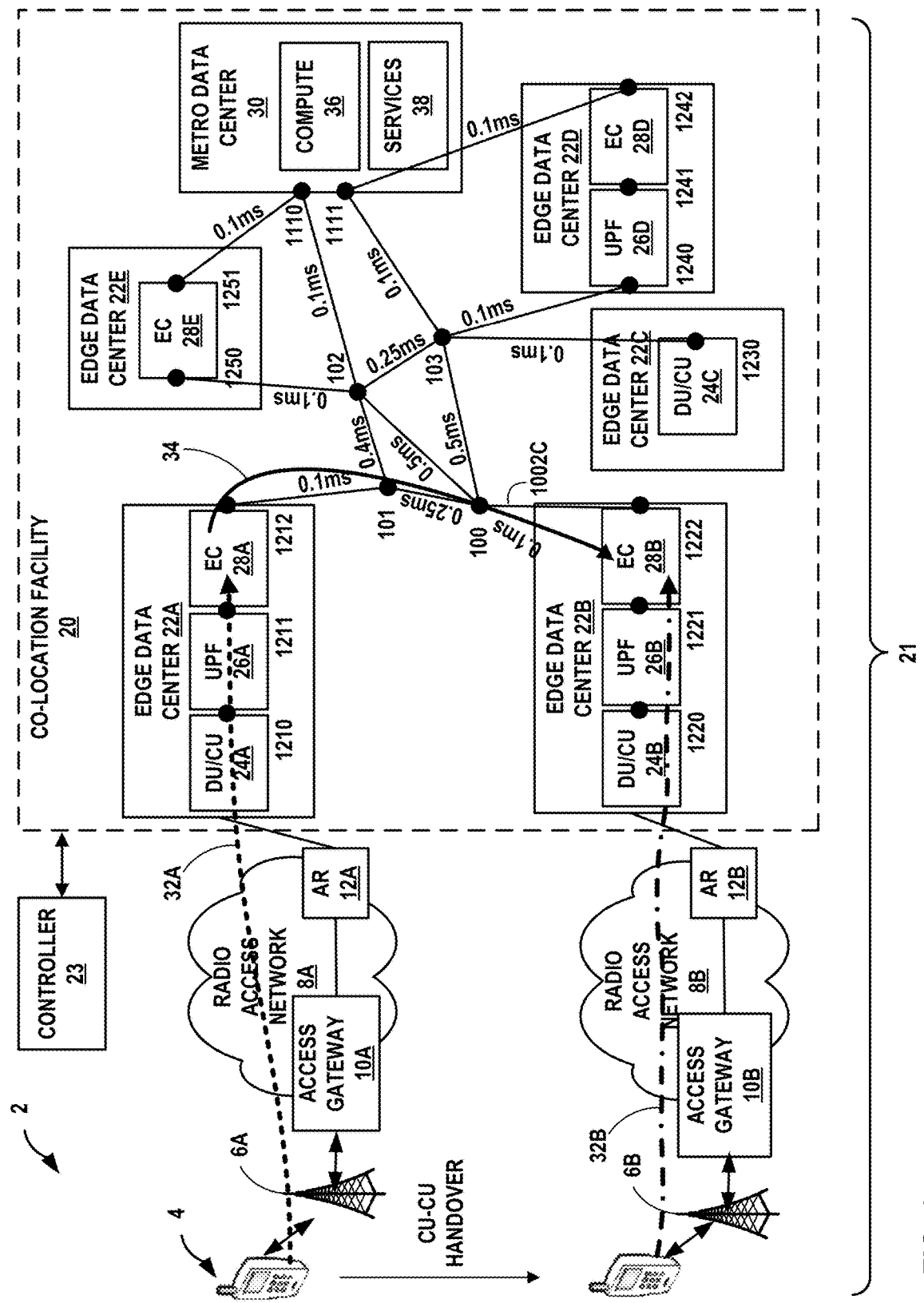
FIG. 1 is a block diagram illustrating an example network for providing network defined edge routing for an application workload, in accordance with the techniques described herein.

FIG. 1 is a block diagram illustrating an example network 2 for providing application workload routing, in accordance with the techniques described herein. In the example of FIG. 1, network 2 includes a regional or metropolitan area data center 30 ("metro data center 30") that provides one or more applications or services 38 (referred to herein as simply "applications 38") for access by user device 4 via a set of interconnected edge data centers (EDCs) 22A-22E (collectively, "edge data centers 22" or "EDCs 22"). In some examples, applications 38 may be replicated on any of edge compute devices of EDCs 22, as further described below.

Device 4 may include physical or virtual devices. For example, device 4 may represent a desktop computer, laptop computer, tablet, smart phones, smart watches, rack-mounted server, other real or virtual server, and/or a container or virtual machine. In some examples, device 4 may represent "Internet-of-Things" (IoT) devices, such as cameras, sensors, televisions, appliances, devices for transport and mobility, such as devices for traffic routing, telematics, package monitoring, smart parking, insurance adjustments, supply chain, shipping, public transport, airlines, and trains, for example.

As shown in FIG. 1, network 2 may include radio access networks (RAN) 8A-8B (collectively, "RANs 8") with access gateways 10A-10B (collectively, "access gateways 10") and access routers 12A-12B (collectively, "access routers 12"), respectively, that provide device 4 with access to resources of EDCs 22 or metro data center 30. For example, device 4 may support both cellular radio access and local wireless networks (e.g., WiFi) and may communicate with base station 6A over wireless links to access radio access network 8A, or similarly with base station 6B over wireless links to access radio access network 8B. Radio access networks 8 may provide network access, data transport and other services to device 4. In this example, radio access networks 8 may implement, for example, a 5th generation of mobile networks ("5G"). A 5G network provides improvements to previous generations of radio access networks, such as 4$^{th}$ generation of mobile networks ("4G") and 4G Long Term Evolution ("LTE"). For example, 5G provides an air interface infrastructure, antennae design (e.g., for massive Multiple Input Multiple Output arrays or "mMIMO") and radio transmission methods (collectively referred to as "5G New Radio") that increases data rates, decreases "air interface" latency, and improvements in capacity (e.g., number of connected devices), among others. Additional information on 5G is described in 3GPP TS 23.501: "System Architecture for the 5G System," 3GPP, version 16.3.0, December 2019, the entire contents of which is incorporated by reference herein. Although the examples described in this disclosure are described with respect to a 5G network, the techniques described in this disclosure are applicable to any radio access network with low-latency requirements.

In some instances, device 4 may access applications 38 provided by compute node 36 of metro data center 30. Metro data center 30 may represent a macro-edge data center. In some examples, metro data center 30 may represent a metro-based interconnection exchange made up of one or more co-location facilities within a single metropolitan area. For example, a co-location facility provider may employ one or more co-location facilities (otherwise referred to as "interconnection facilities"), e.g., metro data center 30, in which multiple customers (e.g., content providers) of the co-location facility provider may locate network, server, storage gear and interconnect to a variety of telecommunications, cloud, and other network service provider(s) with a minimum of cost and complexity. Metro data center 30 may have a switch fabric (not shown) configurable for cross-connecting customer networks located within multiple customer cages. In some instances, the customer cages may each be associated with a different customer of the interconnection facility provider. As used herein, the term "customer" of the interconnection system provider may refer to a tenant of the metro data center 30 deployed by the co-location facility provider, whereby the customer leases space within metro data center 30 in order to co-locate with other tenants for improved efficiencies over independent facilities as well as to interconnect network equipment with the other tenants' network equipment within the interconnection facility or campus for reduced latency/jitter and improved reliability, performance, and security versus transport networks, among other reasons. Metro data center 30 may operate a network services exchange, such as Ethernet Exchange, and Internet Exchange, and/or a Cloud Exchange, for example, to transmit L2/L3 packet data between customer networks. Metro data center 30 may provide both an Ethernet exchange and a cloud-based services exchange, in some examples.

Further example details of a facility that provides a cloud-based services exchange are found in U.S. Pat. No. 9,948,522, filed Apr. 14, 2016 and entitled "Cloud-Based Services Exchange"; U.S. Pat. No. 9,886,267, filed Oct. 29, 2015 and entitled "INTERCONNECTION PLATFORM FOR REAL-TIME CONFIGURATION AND MANAGEMENT OF A CLOUD-BASED SERVICES EXCHANGE"; and in U.S. Provisional Patent Application 62/160,547, filed May 12, 2015 and entitled "PROGRAMMABLE NETWORK PLATFORM FOR A CLOUD-BASED SERVICES EXCHANGE"; each of which are incorporated herein by reference in their respective entireties.

Metro data center 30 may provide, for example, IoT intelligence, data analytics, device management and provisioning, data management, connectivity, event processing, and Application Programming Interface (API) controls to device 4. For instance, metro data center 30 may provide access to applications 38 that include, for example, consumer, industrial, smart city, and/or vehicular applications. For example, metro data center 30 may include a server that provides an execution environment for an application workload (e.g., Kubernetes container) that runs a corresponding application or service instance(s), such as applications 38.

Metro data center 30 is connected to one or more edge data centers, e.g., edge data centers 22, via, for example, data center interconnect links (e.g., fiber optic links). Edge data centers 22 may represent micro-edge data centers connected to a regional data center, e.g., metro data center 30, to enable applications that rely on the existing regionally distributed metro infrastructure to connect to radio access networks 8. EDCs 22 may provide, for example, racks (i.e., including network switches, compute servers, storage arrays, etc.), power, cooling, fiber entry or exit, or other services or resources. In this example, EDCs 22 provide an infrastructure for the physical aggregation points and for providing one or more 5G capabilities, such as radio access network functions, 5G Core ("5GC") functions, computing resources such as a mobile edge compute (MEC) (also referred to as Multi-Access Edge Compute), and/or fiber aggregation. In the example of FIG. 1, EDCs 22 may host a 5G core that defines core control (signaling) and user plane (data) capabilities that make use of cloud native virtualization and enable features such as Control and User Plane Separation (CUPS) and Network Slicing. In this way, EDCs 22 enable 5G capabilities and computing resources located in proximity with each other and in proximity to end devices, e.g., device 4.

In some examples, EDCs 22 may provide 5G capabilities of a 5G Service Based Architecture (SBA) as described in "3GPP TS 23.501: "System Architecture for the 5G System," the entire contents of which is incorporated by reference herein. A 5G Service Based Architecture may include user equipment ("UE") (e.g., device 4), radio access network (e.g., radio access network 8), and a set of interconnected 5G network functions, such as user plane function ("UPF"), access and mobility function ("AMF"), session management function ("SMF"), policy control function ("PCF") and network slice selection function ("NSSF"). The 5G network functions may be referred to herein as "5G core functions."

A UPF handles uplink and downlink data forwarding between radio access network 8 and data networks. AMF is a control plane function responsible for registration of device 4 and for session and mobility management. SMF is responsible for bearer and session management including the management of IPv4 and IPv6 addressing of device 4. PCF is responsible for managing and authorizing session parameters for device 4 including data rate, Quality of Service (QoS), and charging. NSSF is responsible for establishing and managing network slicing parameters for the device sessions including the 5G core and data transport domains. Each network function exposes its functionality, for example, through a Service Based Interface (SBI), which uses a REpresentation State Transfer (REST) interface using Hypertext Transfer Protocol (HTTP).

User equipment, e.g., device 4, may be equipped with 5G New Radio (NR) capabilities. For example, device 4 include an air interface structure, antennae design for massive Multiple Input Multiple Output (mMIMO) arrays, and radio transition methods (e.g., beamforming/beam steering) to provide increases in data rates, decreases in air interface latency, and improvements in capacity (e.g., number of connected devices).

EDCs 22 may provide one or more functions of a 5G radio access network. Functions of a 5G radio access network include radio units ("RUs"), distributed units ("DUs"), and centralized units ("CUs"), with the combination of DU and CU referred to as a Next Generation Node B (gNB). The radio units provide functions such as analog to digital conversion, filtering, power amplification and/or transmit/receive functionality. Radio units may be integrated with the antennae to use mMIMO. A distributed unit may represent a logical node that includes a one or more functions (i.e., a subset) of gNB and is controlled by the centralized unit via an interface (referred to as a "fronthaul interface"). Distributed units may be colocated with antennas. A centralized unit may represent a logical node that includes gNB functions not allocated to the distributed units. The gNB functions may include, for example, transfer of user data, mobility control, radio access network sharing, positioning, session management, and other network functions. These network functions may be referred to herein as "RAN functions."

In some examples, EDCs 22 may include an MEC infrastructure for hosting application workloads (e.g., Kubernetes container) that run application and/or service instances. For example, edge compute devices 28 may be located within edge data centers 22 that may also host 5G RAN functions and/or 5G core functions. In some examples, metro data center 30 may replicate applications 38 within any of edge computing devices 28 of edge data centers 22. In this way, an MEC infrastructure may enable the applications to be moved from a centralized data center (e.g., metro data center 30) to an edge data center, and is therefore closer to the end devices and reduces latency.

In some examples, certain application classes need to be routed according to certain traffic class requirements. Application classes may include, for example, applications requiring low latency and applications requiring a high data rate. A low latency class of applications may include applications providing critical services, such as collision avoidance or traffic look-ahead capability applications, Vulnerable Road User (VRU) applications that inform a vehicle of an imminent collision with a pedestrian, bicyclist, motorbike user, or the like. A high data rate class of applications may include applications requiring a high data rate, such as infotainment applications including video content delivery, general internet access, or other services such as intelligent parking and high-definition maps. Each traffic class may have a set of associated parameters including latency bound (e.g., round trip time), peak data rates, maximum error rate, reliability and restoration requirements, packet layer QoS, 5G QoS flow identifier (QFI), or similar parameters.

In certain examples, low latency class of applications should be routed on a path with the lowest latency from a radio access network and terminated on an application workload (e.g., a Kubernetes container). In these examples, an ideal physical location for such application workload is locally within the MEC infrastructure in the same EDC which hosts 5G radio access network functions and/or 5G core functions that services the mobile session providing connectivity for traffic of the application associated with the low latency class. However, not all EDCs may include 5G radio access network functions, 5G core functions, and/or edge computing functions. For example, some of EDCs 22 may be smaller Centralized RAN (CRAN) hubs without edge compute servers. In the example of FIG. 1, EDC 22A includes a distributed unit or centralized unit 24A ("DU/CU 24A"), user plane function 26A ("UPF 26A"), and edge compute 28A ("EC 28A"). On the other hand, EDC 22B includes DU/CU 24B and UPF 26B; EDC 22C includes DU/CU 24C; EDC 22D includes UPF 26D and EC 28D; and EDC 22E includes EC 28E. FIG. 1 is only one example, and may include any number of edge data centers with different infrastructures.

To route traffic according to low-latency requirements of a 5G network, the techniques described in this disclosure provide network defined edge routing for an application workload. For example, network 2 includes a controller 23 that may compute paths within a set of interconnected edge data centers that define a geographic zone or "domain" of mobile edge computes (referred to herein as "MEC domain 21") that meet traffic class requirements as well as performing traffic engineering using, for example, segment routing (SR) techniques, such as by using a Source Packet Routing in Networking (SPRING) paradigm. To perform segment routing, a network device (e.g., router) steers a packet through an ordered list of instructions, called "segments," such as one or more labels in a label stack ("segment list"), to a packet, and intermediate routers along the path remove labels from the label stack applied to the packet as the packet is forwarded through the network. Additional details of segment routing are further described in Filsfils et. al., Filsfils, ed., et al., "Segment Routing Architecture, Internet Engineering Task Force, Request for Comments 8402, July 2018, while Segment Routing use cases are described in Filsfils et. al., "Segment Routing Use Cases," Internet-Draft draft-filsfils-spring-segment-routing-use-cases-01, Oct. 21, 2014.

In some examples, controller 23 may construct the paths with a degree of granularity. For example, controller 23 may construct a path matrix that lists all possible paths linking all possible source-destination pairs within MEC domain 21 such as between EDCs 22, between any of DU/CUs 24 and any of UPFs 26, and/or between any of UPFs 26 and any of ECs 28.

According to the disclosed techniques, controller 23 may create paths based on element registration information provisioned, for example, during initial configuration of the network. For example, modules hosted on edge data centers 22 in MEC domain 21 that provide RAN functions (e.g., DU/CUs 24), 5G core functions (e.g., UPFs 26), and/or ECs 28 are registered with controller 23. Network devices such as routers or switches (illustrated in the example of FIG. 1 as black circles) that interconnect the modules that provide the RAN functions, 5G core functions, and ECs 28 are also registered with controller 23 (e.g., by advertising node segment identifiers (SIDs) of the network devices). Similarly, all transport routers and optical nodes within the packet/optical interconnection fabric 20 ("interconnection fabric 20" or "MEC domain fabric 20") that interconnects EDCs 22 may register with controller 23. Controller 23 may assign identifiers, such as segment identifiers (SIDs) to each of the modules that provide the RAN functions, 5G core functions, and ECs 28.

Figure 2:
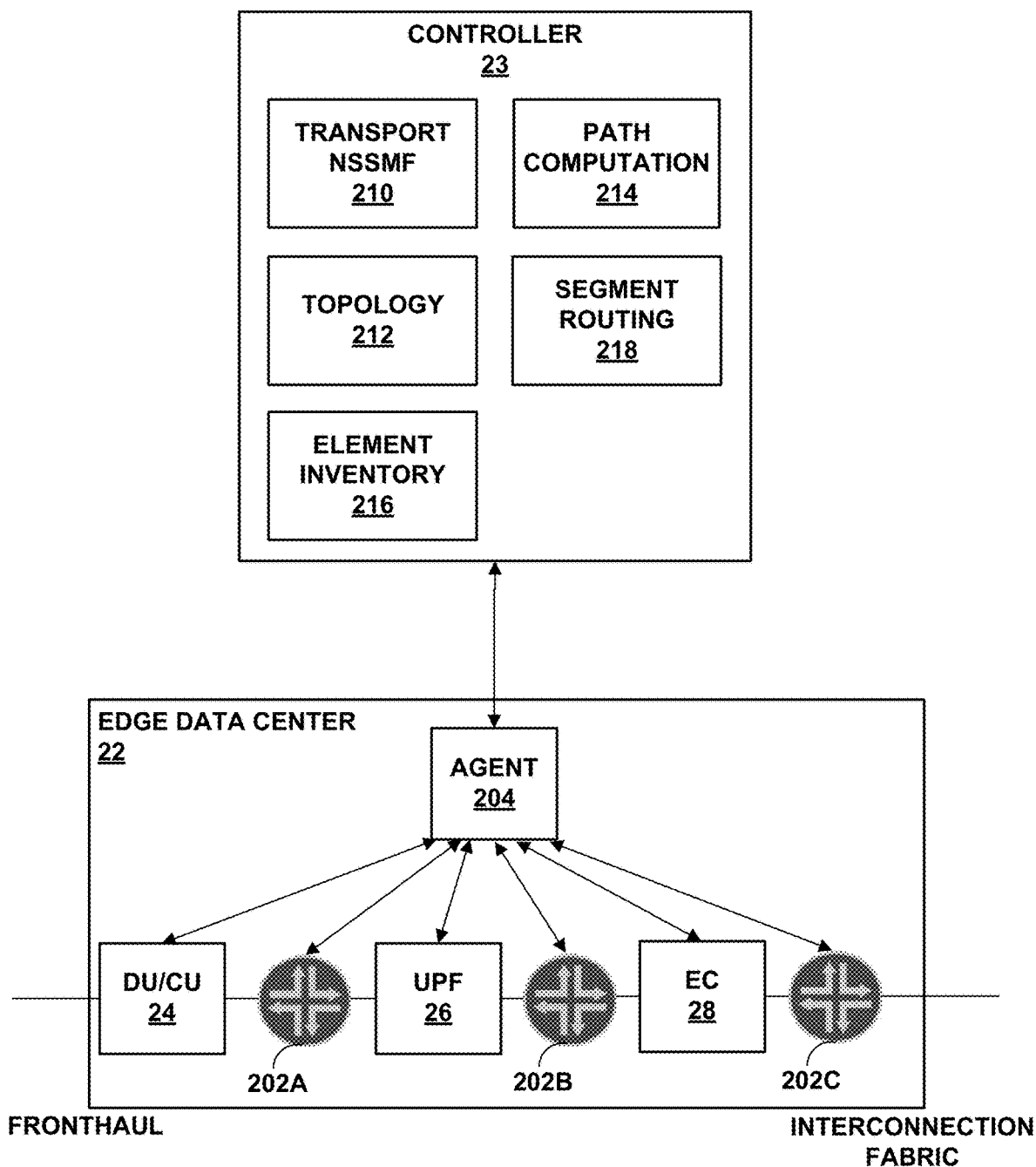
FIG. 2 is a block diagram of a controller and edge data center in further detail, in accordance with the techniques described in this disclosure.

Controller 23 may, in response to receiving the element registration information, generate and store an EDC element registration information record for each of EDCs 22 (as further described in FIG. 2). The EDC element registration information record may include an identifier for a respective edge data center, a segment identifier for each module hosted on the respective edge data center, and a segment identifier for each network device hosted on the respective edge data center. As one example, controller 23 may generate an EDC element registration information record for EDC 22A that may include an identifier for EDC 22A, a segment identifier 1210 for DU/CU 24A, a segment identifier 1211 for UPF 26A, a segment identifier 1212 for EC 28A. Similarly, controller 23 may generate an EDC element registration information record for EDC 22B that may include an identifier for EDC 22B, a segment identifier 1220 for DU/CU 24B, and a segment identifier 1221 for UPF 26B.

Controller 23 may use the segment identifiers in the EDC element registration records to construct network paths expressed as segment routing label stacks. For example, controller 23 may encode a SID as a Multi-Protocol Label Switching (MPLS) label, and encode an ordered list of SIDs as a stack of segment routing labels. In some examples, the segment routing labels may be implemented as SRv6 128-bit labels.

Controller 23 may map the network paths with application traffic classes. Traffic classes may include latency bounds, peak data rates, maximum error rate, reliability and restoration requirements, packet layer Quality of Service (QoS), 5G QoS Flow Identification (QFI), etc. As one example, controller 23 may assign a low latency class for applications providing critical services, such as Cellular Vehicle to Infrastructure (C-V2I) congestion avoidance or traffic look-ahead capability, or a Vulnerable Road User (VRU) application that provides a vehicle with information of an imminent collision. As another example, controller 23 may assign a high data rate class for applications that provide infotainment, such as video content delivery, internet access, or other services such as intelligent parking and high-definition maps.

Controller 23 may collect network fabric path information based on the link and routing metrics between the packet and optical domains to construct network paths that meet the traffic class requirements. Routing metrics may include latency, bandwidth, hop count, link utilization, reliability, throughput, load, packet loss, etc. For example, network devices may use network performance measurement protocols, such as One-way Active Measurement Protocol (OWAMP), Two-way Active Measurement Protocol (TWAMP), Simple Network Management Protocol (SNMP), and/or other protocols and techniques. Controller 23 may also identify path parameters of the interconnection fabric 20, such as span latencies, capacity (i.e., bandwidth), protection state, and others.

In the example of FIG. 1, the link between a network device within edge data center 22A (e.g., router with node SID 1212) to a network device (e.g., router with node SID 101) in the interconnection fabric 20 has a latency of 0.1 milliseconds (ms); the link between a network device with node SID 101 and a network device with node SID 102 has a latency of 0.4 ms; the link between a network device with node SID 102 and a network device within metro data center 30 (e.g., router with node SID 1110) has a latency of 0.1 ms; and so on. Using the link and routing metrics of the network (e.g., latency in this example), controller 23 may define paths mapped to traffic classes (e.g., low latency class in this example) so that the paths within the MEC domain 21 can be contained within expected performance bounds.

In the example of FIG. 1, controller 23 may compute paths that meet different traffic class requirements and perform traffic engineering using source routing based on segment routing labels. For example, controller 23 may compute path 32A based on EDC element registration information records of edge data centers (EDCs) 22 and the routing metrics. As one example, edge compute 28A of EDC 22A may host a first application workload that runs an application having traffic associated with a low latency class. Since the first application workload is local within the same EDC which hosts 5G radio access network functions and/or 5G core functions that services the mobile session providing connectivity for traffic of the application associated with the low latency class (and therefore the scenario with the lowest latency), controller 23 may, in this example, compute path 32A to route traffic from device 4A to edge compute 28A. For example, controller 23 may generate a stack of segment routing labels as {1210, 1211, 1212} to steer the traffic from device 4A to edge compute 28A. Traffic forwarded along path 32A is forwarded to network devices within edge data center 22A having node SIDs associated with the label stack.

Controller 23 may map the segment routing label stack to a low-latency traffic class. In this way, traffic for a low-latency class of applications may be steered along path 32A, which traverses DU/CU 24A, UPF 26A, and EC 28A of EDC 22A.

In another example, edge compute 28E of EDC 22E may host a second application workload that runs an application having traffic associated with a low latency class. In this example, the second application workload is not local within the same EDC which hosts 5G radio access network functions and/or 5G core functions that services the mobile session providing connectivity for traffic of the application associated with the low latency class. Given the link and routing metrics, controller 23 may, in this example, compute a path (not shown) to route traffic from device 4B to DU/CU 24B and UPF 26B in EDC 22B to EC 28E of EDC 22E, via network devices in interconnection fabric 20, which has the lowest latency. For example, controller 23 may generate a stack of segment routing labels as {1220, 1221, 100, 102, 1250} to steer the traffic from device 4B to edge compute 28E. Traffic forwarded along path 32B is forwarded to network devices within edge data center 22B (e.g., node SIDs of 1220, 1221), network devices in the interconnection fabric (e.g., node SIDs of 100, 102), and a network device within edge data center 22E (e.g., node SID 1250).

In another example, compute node 36 of metro data center 30 may host a third application workload that runs an application (e.g., application 38) having traffic associated with a low latency class. In this example, the third application workload is not local within the same EDC which hosts 5G radio access network functions and/or 5G core functions that services the mobile session providing connectivity for traffic of the application associated with the low latency class. Given the link and routing metrics, controller 23 may, in this example, compute a path (not shown) to route traffic from device 4 to DU/CU 24A, UPF 26A, and EC 28A in EDC 22A to compute node 36 of metro data center 30 via network devices in interconnection fabric 20, which has the lowest latency. For example, controller 23 may generate a stack of segment routing labels as {1210, 1211, 1212, 101, 102, 1110} to steer the traffic from device 4 to compute node 36. Traffic forwarded along the path is forwarded to network devices within edge data center 22A (e.g., node SIDs of 1210, 1211, 1212), network devices in the interconnection fabric (e.g., node SIDs of 101, 102), and a network device within metro data center 30 (e.g., node SID of 1110).

Additional examples of network defined edge routing for an application workload are described in U.S. application Ser. No. 16/949,063, entitled "NETWORK DEFINED EDGE ROUTING FOR AN APPLICATION WORKLOAD," filed Oct. 12, 2020, the entire contents of which is incorporated by reference herein.

In the example of FIG. 1, device 4 may be a mobile device and may move within range of base station 6B rather than base station 6A, and communicate with edge data centers 22 via radio access network 8B. In these examples, device 4 may perform inter-centralized unit handover, e.g., handover from radio cells aggregated at a given EDC to radio cells aggregated at another EDC. In this example, inter-CU handover results in device 4 attaching to a CU in a different edge data center, e.g., CU 24B in edge data center 22B. Typically, the application workload is still anchored at the original EDC, e.g., EDC 22A, and network traffic is still routed to the original EDC. The additional network distance to route network traffic to the original EDC may result in added latency, which may cause applications associated with a low latency class to perform incorrectly or experience degraded performance.

In accordance with the techniques described herein, controller 23 may move or replicate the application workload hosted on an original edge compute (e.g., edge compute 28A) of the original EDC (otherwise referred to herein as "first EDC") to a different edge compute in a different edge data center (otherwise referred to herein as "second EDC") that is locally accessible by device 4 (e.g., edge compute 28B of EDC 22B) and route the network traffic to the new edge compute using paths mapped to respective traffic classes within the MEC domain of the network. This is referred to herein as "application workload routing."

In some examples, controller 23 may perform application workload routing reactively and/or proactively. For example, the application workload routing may be performed reactively in response to determining an inter-CU handover has occurred or is occurring (referred to herein as "reactive mode"). For example, controller 23 may receive a signaling message from 5G Core (5GC) functions (e.g., CU 24B) of EDC 22B that device 4 has requested to attach to CU 24B (e.g., handover request) or has attached to CU 24B. In response, controller 23 may replicate or move the application workload hosted on EC 28A of EDC 22A to EC 28B of EDC 22B (illustrated in FIG. 1 as element "34").

Alternatively, or additionally, controller 23 may perform the application workload routing proactively. For example, controller 23 may perform application workload routing in anticipation of an inter-CU handover to a new EDC based on data learned from the mobile device and/or the mobile network. For example, device 4 may supply telemetry data to controller 23 on its movement pattern, such as location data, direction of travel, etc. In some examples, the mobile network can additionally, or alternatively, provide network data on the approaching handover event for the device, such as RAN-specific data including Signal to Noise Ratio (SNR), Received Signal Strength Indication (RSSI), available quality of service (QoS) (e.g., access priority, admission priority, congestion indication), etc. In some examples, controller 23 may include a machine-learning (ML) or artificial intelligence (AI) engine used to predictively determine whether mobile device handover may occur and coordinate the new EC resource location where the application workload is to be replicated or moved.

Once the application workload is replicated or moved to the new edge compute, controller 23 may compute paths within a set of interconnected edge data centers that define a geographic zone or "domain" of mobile edge computes (referred to herein as "MEC domain 21") that meet traffic class requirements as well as performing traffic engineering using, for example, segment routing (SR) techniques. In this example, controller 23 may construct a segment routing label stack for a path to steer the application traffic to the new edge compute, e.g., along path 32B, which traverses DU/CU 24B, UPF 26B, and EC 28B of EDC 22B.

In this way, the techniques may provide application workload routing to coordinate the movement or replication of an application workload to appropriate edge compute resources, and route application traffic along network paths computed according to respective traffic classes in compliance with 5G network requirements. For example, by grouping the edge data centers 22 as part of a MEC domain and collecting element registration information within the network, controller 23 may, based on link and routing metrics collected from the packet and optical domains and the element registration information of the MEC domain, compute network paths according to respective traffic classes in compliance with 5G network requirements and provide the computed network paths to device 4 such that device 4 may send traffic for an application workload along the computed paths within the MEC domain. Moreover, in the event device 4 moves around and the device performs inter-CU handover, controller 23 may replicate the application workload to compute resources of a new edge data center, and may compute network paths to the new edge data center to ensure the network traffic traverses network paths that are in compliance with 5G network requirements.

FIG. 2 is a block diagram of a controller and an edge data center in further detail, in accordance with the techniques described in this disclosure. In the example of FIG. 2, edge data center (EDC) 22 may represent an example instance of any of EDCs 22 of FIG. 1. EDC 22 of FIG. 2 is only one example instance of an EDC and may alternatively include (or exclude) any of the RAN functions (e.g., DU/CU), user plane function, and/or edge compute. Controller 23 may represent an example instance of controller 23 of FIG. 1.

EDC 22 includes modules that provide one or more RAN functions, one or more 5G core functions, and/or one or more edge computing functions. In this example, EDC 22 includes DU/CU 24 that provides RAN functions, UPF 26 that provides 5G core functions, and EC 28 that provides edge computing functions. EDC 22 includes network devices, such as routers 202A-202C (collectively, "routers 202") to communicate between modules of EDC 22 and/or to communicate to the interconnection fabric 20. For example, DU/CU 24 is communicatively coupled to UPF 26 via router 202A, and UPF 26 is communicatively coupled to EC 28 via router 202B. Router 202C of EDC 22A may represent a router to communicate with interconnection fabric 20. Router 202C may be referred to herein as an "interconnection fabric router" or "MECD fabric router."

Each of the elements of EDC 22 may register with a local agent, e.g., agent 204. For example, DU/CU 24, UPF 26, EC 28, and routers 202A-202C within EDC 22 may register with agent 204. Agent 204 may assign identifiers for each of the registered elements and sends EDC element registration information, such as an EDC identifier and an element identifier, to controller 23. For example, agent 204 may send an eXtensible Messaging and Presence Protocol (XMPP) message or other communication protocol message, including the EDC element registration information to controller 23.

In response to receiving the EDC element registration information, the element inventory module 216 of controller 23 may generate an EDC element registration record for each of the EDCs in the MEC domain. The EDC element registration record may include an identifier for a particular EDC and segment routing identifiers (e.g., node SIDs) assigned to the registered elements within the EDC. For example, controller 23 includes an element inventory module 216 that assigns segment routing segment identifiers (e.g., node SID) for each of the registered elements. An example EDC element registration record for EDC 22, such as EDC 22A of FIG. 1, is shown below:

```
{
    "EDC ID": "EDC1",
    "Element List": {
        "MECD Fabric Router": ["Node SID": 1212],
        "CU": ["Node SID": 1210],
        "EDC Router CU-UPF": ["Node SID": 1210],
        "UPF": ["Node SID":1211],
        "EDC Router UPF-EC": ["Node SID": 1211],
        "EC": ["Node SID": 1211]
    }
}
```

In the above example, the EDC element registration record for EDC 22 (identified by the identifier "EDC1") includes segment identifiers for modules DU/CU 24, UPF 26, and EC 28, and identifiers (e.g., segment routing identifiers) for routers 202. The EDC element registration record may be stored in a data structure, e.g., segment identifier database, such as in element inventors 216.

Controller 23 may include Network Slice Selection Management Function (NSSMF) module 210 that manages and orchestrates network slice selection instances (NSSI) for a particular device. In the example of FIG. 2, NSSMF module 202 may receive a request to provide network defined edge routing for an application workload that includes a traffic class identifier, DU/CU identifier, UPF identifier, and QoS flow identifier (QFI). NSSMF module 202 may receive the request using Multiprotocol Border Gateway Protocol (MP-BGP) or a Representational State Transfer Application Programming Interface (REST API). NSSMF module 210 may also respond to the request to provide network defined edge routing for an application workload with a segment routing label stack from the traffic class mapping structure, as described below.

Controller 23 may also include topology module 212 that is responsible for topology discovery of MEC domain 21, path computation module 214 to compute paths within the MEC domain, and segment routing module 218 for segment routing label assignments (as described above). For example, topology module 212 may use routing protocols (e.g., Border Gateway Protocol (BGP), Interior Gateway Protocol (IGP) or other routing protocols) to determine the topology of the interconnection fabric 20.

Path computation module 214 may compute paths that meet traffic class requirements. For example, path computation module 214 may collect network fabric path information based on the link and routing metrics between the packet and optical domains. As one example, controller 23 may use a link-state protocol, such as IGP, to receive IGP messages including path computation information that may include traffic engineering metrics, delay, IGP metrics, and others. IGP may include Open Shortest Path First (OSPF) or Intermediate System to Intermediate System (IS-IS). Additional examples of IGP metrics are described in F. Le Faucheur, et al., "Use of Interior Gateway Protocol (IGP) Metric as a second MPLS Traffic Engineering (TE) Metric," Request for Comments 3785, May 2004, the entire contents of which is incorporated by reference herein. Additional examples of other metrics are described in S. Previdid, Ed., et al., "IS-IS Traffic Engineering (TE) Metric Extensions," Request for Comments 7810, May 2016, the entire contents of which is incorporated by reference herein. In some examples, an IGP message may also include a path constraint that includes topology related constraints, such as excluded links/nodes, color-coded exclusions or inclusion for certain Quality of Service (QoS) or Service Level Agreement (SLA) groups (e.g., certain nodes or links are only used for traffic having a higher QoS or certain SLA), and others.

Using the EDC element registration record and the collected link and routing metrics, path computation module 214 may compute paths within the MEC domain that meet expected performance bounds. For example, path computation module 214 may use, for example, Constrained Shortest Path First (CSPF) or other path computation algorithms. The paths may be defined by a stack of labels (e.g., segment identifiers) from EDC element registration record. Path computation module 214 may also generate a traffic class mapping structure that maps traffic classes (e.g., low latency class or high data rate class) to one or more computed paths contained within expected performance bounds and within the MEC domain. For example, path computation module 214 may define traffic classes, each including one or more paths defined by a label stack of segment identifiers from the EDC element registration record. An example traffic class mapping structure is shown below:

```
{
"MECD": "MEC Domain1",
    "EDC 1": {
        "Traffic Class": {
            "Class0": {
                "Path0": {
                    "LabelStack": {
                        "UplinkDirection": {
                            "CU_Label": "Null", "UPF_Label": 1211, "EC_Label": 1212},
                        "DownlinkDirection": {
                            "CU_Label": 1210, "UPF_Label": 1211, "EC_Label": "Null"}},
            "Class1": {
                "Path0": {
                    "LabelStack": {
                        "UplinkDirection": {
                            "CU_Label": "Null", "UPF_Label": 1211, "R_Label": 1212,
                            "R_Label":101, "R_Label":102, "EC_Label":1250},
                        "Downlink Direction": {
                            "CU_Label":1210, "UPF_Label":1211, "R_Label":1212,
                            "R_Label":101, "R_Label":102, "EC_Label":"Null"}},
                "Path1": {
                    "LabelStack": {
                        "UplinkDirection": {
                            "CU_Label": "Null", "R_Label": 1212, "R_Label": 101,
                            "R_Label": 102, "R_Label": 103, "UPF_Label": 1240, "EC_Label":
1241},
                        "DownlinkDirection": {
                            "CU_Label": 1210, "R_Label": 1212, "R_Label": 101,
                            "R_Label": 102, "R_Label": 103, "UPF_Label": 1240, "EC_Label":"
Null"}}
                }
            }
        }
    }
}
```

In the example traffic class mapping structure shown above, "MEC Domain1" may represent MEC domain 21, and "EDC1" may represent a particular EDC 22, e.g., EDC 22A. The example traffic class mapping structure includes traffic classes, e.g., "Class0" and "Class1," each with one or more paths. In this example, "Class0" may represent a low latency class that is mapped to "Path0." When NSSMF module 210 receives a request to provide network defined edge routing for a low latency class of applications, NSSMF module 210 may return a segment routing label stack (e.g., upstream and/or downstream label stack) of "Path0" that is mapped to "Class0." "Class1" may represent a high data rate class that is mapped to "Path0" and "Path1." When NSSMF module 210 receives a request to provide network defined edge routing for a high data rate class of applications, NSSMF module 210 may return a segment routing label stack of "Path0" and/or "Path1" that is mapped to "Class1."

Figure 3:
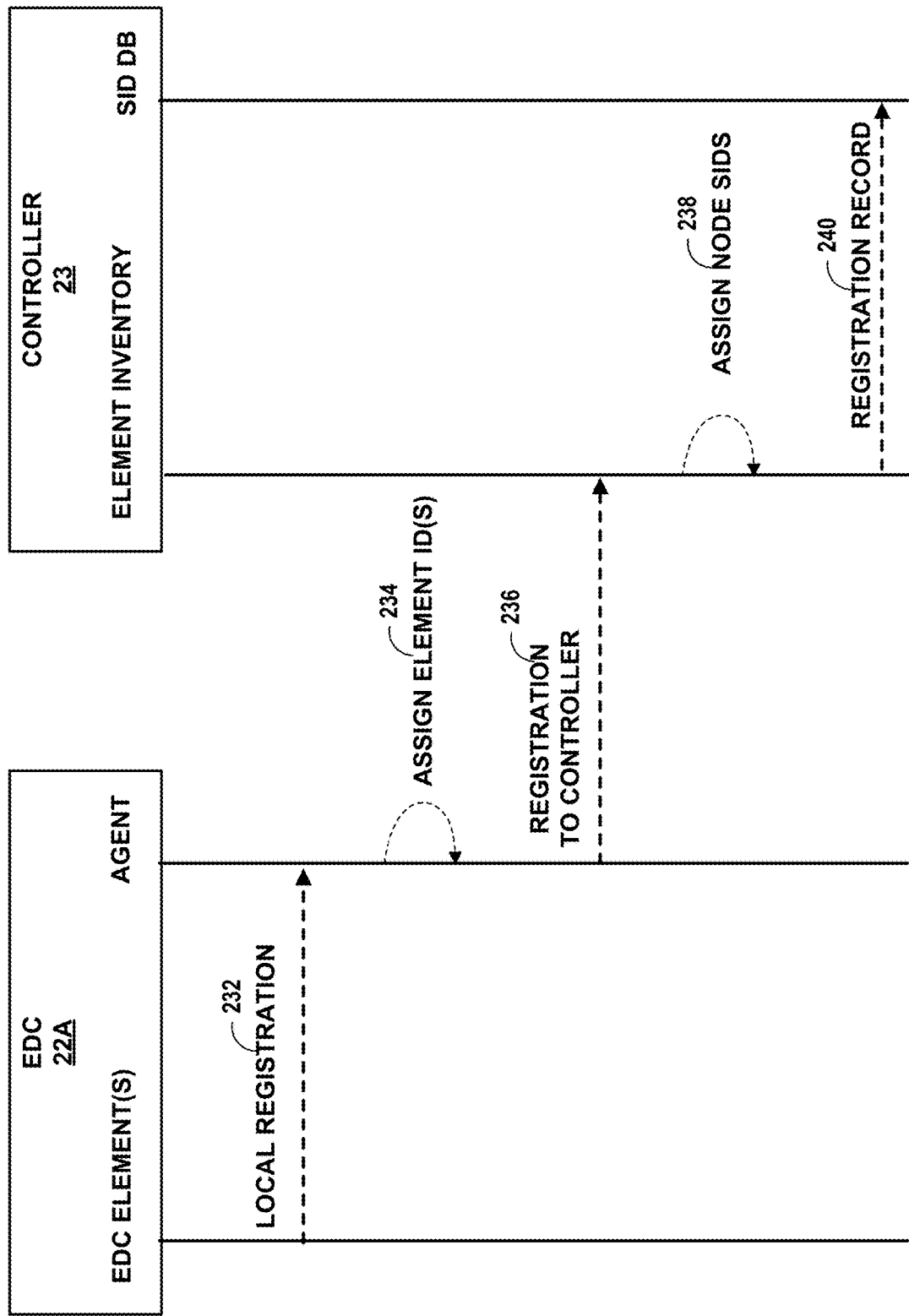
FIG. 3 is a block diagram illustrating an example operation of network element registration, in accordance with the techniques described in this disclosure.

FIG. 3 is a flowchart illustrating an example operation of edge data center element registration, in accordance with the techniques described in this disclosure. The example of FIG. 3 is described with respect to edge data center (EDC) 22A and controller 23 of FIGS. 1 and 2.

In the example of FIG. 3, modules of EDC 22A (e.g., DU/CU 24A, UPF 26A, EC 28A, routers 202) register with a local agent 204 of EDC 22A (232). Agent 204 assigns identifiers for the EDC and elements of the EDC (234). Agent 204 of EDC 22A sends the EDC element registration information (e.g., EDC ID, element IDs) to controller 23 (236). In response to receiving the EDC registration information, element inventory module 216 of controller 23 assigns segment routing identifiers (e.g., node SIDs) for the registered EDC elements (238) and generates an EDC element registration record with the segment routing identifiers. Element inventory module 216 stores the EDC element registration record in a data structure (e.g., SID database) of controller 23 (240).

Figure 4:
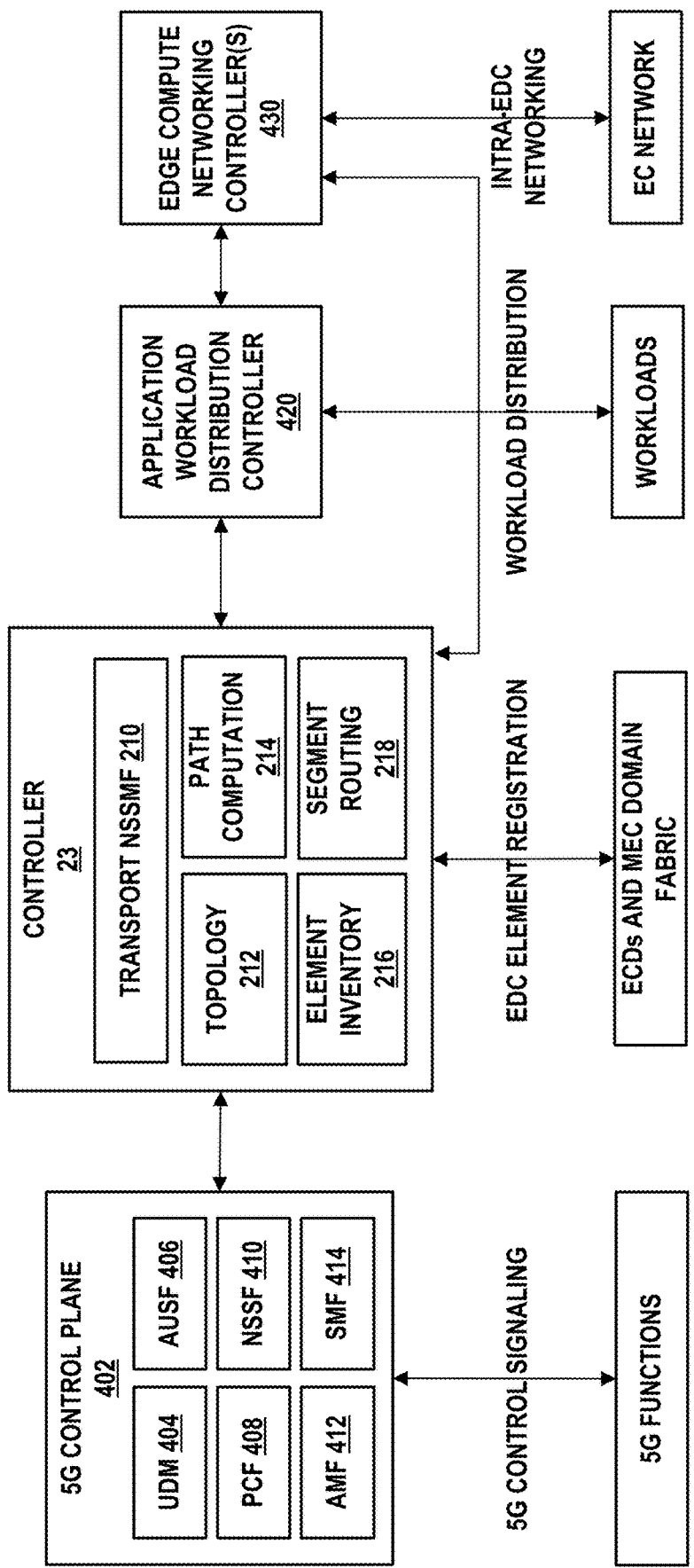
FIG. 4 is a block diagram illustrating controller interactions, in accordance with the techniques described in this disclosure.

FIG. 4 is a block diagram illustrating controller interactions, in accordance with aspects of the techniques described in this disclosure. In the example of FIG. 4, 5G control plane 402, controller 23, application workload distribution controller 420, and edge compute network controller 430 may be executed on the same device or executed on different devices.

In the example of FIG. 4, the 5G Control Plane 402 handles all signaling related to providing connectivity and services to 5G devices or user equipment (e.g., devices 4 of FIG. 1). 5G control plane 402 may execute control plane functions, such as Unified Data Management (UDM) 404, Authentication Server Function (AUSF) 406, Policy Control Function (PCF) 408, Network Slice Selection Function (NSSF) 410, Access and Mobility Function (AMF) 412, and Session Management Function (SMF) 414.

UDM 404 manages data of user equipment. For example, UDM 404 may generate Authentication and Key Agreement (AKA) credentials, user identification handling, access authorization based on subscription data, subscription management, and others. AUSF 406 performs authentication with user equipment. PCF 408 may manage and authorize session parameters for the IoT device including data rate, QoS and charging. NSSF 410 may establish and manage network slicing parameters for sessions with user equipment, e.g., devices 4, including the 5GC and transport domains. NSSF 410 is also used to interact with controller 23. AMF 412 is responsible for user equipment (e.g., device 4) registration management, connection management, reachability management, mobility management, and various functions relating to security and access management and authorization. SMF 414 is responsible for bearer and session management, such as bearer and session establishment, modification, and release.

As described above, controller 23 is responsible for the edge data center element registration, MEC domain topology discovery, path computations and segment routing label assignments. Controller 23 interacts with 5G control plane 402, nodes in the MEC domain fabric, Application Workload Distribution Controller (AWDC) 420 and the Edge Compute Networking Controllers ("ECNC") 430.

Application Workload Distribution Controller 420 is responsible for workload scheduling and distribution within the Edge Computing environments in the EDCs (e.g., to replicate the application on metro data center 30 to an edge compute of an EDC). Application Workload Distribution Controller 420 may also perform application workload routing (e.g., reactively or proactively), in accordance with the disclosed techniques. For example, Application Workload Distribution Controller 420 may receive, from controller 23, application workload scheduling requests (e.g., request for identifier of new EDC and/or identifier of new edge compute) and send application workload scheduling responses (e.g., with the new EDC identifier and/or edge compute identifier) to controller 23. Application Workload Distribution Controller 420 may also send an application workload replication (or move) request to the original edge compute (e.g., EC 28A of FIG. 1), which causes the original edge compute to replicate its application workload to the new edge compute identified by the EDC ID and/or EC ID (e.g., EC 28B of FIG. 1). The application workload replication request may, for example, include an application workload identifier (WL) and/or EC identifier. In some examples, Application Workload Distribution Controller 420 may receive telemetry data from user equipment (e.g., device 4 of FIG. 1) and/or network insights from 5GC functions (DU, CU, UPF, etc.) to determine the handover probability. In some examples, Application Workload Distribution Controller 420 may include an artificial intelligence/machine learning engine to determine, from the telemetry data and/or network insights, whether inter-CU handover may occur. In the event Application Workload Distribution Controller 420 determines that inter-CU handover may occur, Application Workload Distribution Controller 420 may send an application workload replication request (e.g., application workload identifier and/or EC identifier) to the original edge compute to proactively cause the original edge compute to replicate its application workload to the new edge compute.

In some examples, Application Workload Distribution Controller 420 may activate an application workload hosted on an edge computing function of an edge data center provided by an application provider that is common to different mobile providers. As further described in FIG. 7, an application provider may provide an edge data center including an edge computing function that hosts an application workload for access by different edge data centers provided by different mobile providers. In these examples, controller 23 may receive element registration information for the edge computing function that hosts the application workload (e.g., EC 28E) including an indicator specifying that the edge computing function of the edge data center (e.g., edge data center 22E) is provided by a common application provider. Application Workload Distribution Controller 420 may receive from controller 23 workload scheduling requests for each of the devices accessing the different mobile providers to access the application workload. Each of the workload scheduling requests may include a common identifier for the edge computing function hosting the application workload. In response, Application Workload Distribution Controller 420 may send an application workload activation request to the edge computing function hosting the application workload to activate the application workload for the devices.

Edge Compute Networking Controllers 430 may represent software defined networking (SDN) controllers responsible for networking within the edge computing environments (e.g., group of containers called a pod), including the support for segment routing. Segment routing may be supported directly on network interface cards (e.g., SmartNICs) of the edge compute servers. This allows for end-to-end segment routing traffic processing regardless of the user equipment and EC workload IP addressing.

As one example operation, a user equipment, e.g., device 4, performs attachment and authentication and registration procedures to connect to radio access network 8. An operator (e.g., Mobile Network Operator (MNO)) of the 5G Control Plane performs functions for attachment of the device 4. For example, AMF 412 performs attachment procedures. UDM 404 performs subscriber identification or authentication. PCF 408 performs policy execution, 5G QoS Flow identification (QFI) and parameter selection. AMF 412 or SMF 414 performs node mapping and selection of DU, CU and UPF (the UPF selection may be influenced by controller 23) for the device, and 5G QoS Flow ID (QFI) assignment for the traffic class required for the device. NSSF 410 sends request for optimized edge routing to controller 23. The request may include a Traffic Class ID, CU ID, UPF ID, and QFI. In some examples, the CU ID and UPF ID matches the MEC domain element IDs registered by the agent to controller 23. For example, the CU ID may be used to identify the source EDC for the path selection as well as for the identification of where to schedule the EC workload. NSSF 410 may use MP-BGP or a REST API to send the request to controller 23.

Controller 23 identifies a valid path record within the best set of constraints to satisfy the traffic class requirements received from the NSSF 410. Controller 23 responds to NSSF 410 with a response with the segment routing label stacks for the mobile elements: CU and UPF computed for the user equipment session.

NSSF 410 communicates to the SMF 414 the optimized edge routing information. The SMF 414 may replace the original UPF selected for the device 4 during the initial node selection procedure with the UPF corresponding to the UPF Node SID received from controller 23 based on the path computation results from path computation module 214. This is a way to influence the UPF node selection based on the path routing with the MEC domain. In other words, this is how the workload routing/scheduling can influence where the mobile traffic can terminate optimally relative to the workload location.

The SMF 414 is expected to signal the segment routing label stack information along with the mobile session parameters for the device 4 to the CU and the UPF elements. The segment routing labels may be used by the CU and UPF in the same way as GPRS Tunneling Protocol User Plane (GTP-U) Tunnel Endpoint Identifiers (TEIDs) are used to manage the packet switching in GTP-U.

The segment routing label stack communicated from controller 23 to NSSF/SMF/CU/UPF is used to handle the traffic in the Uplink direction. The CU is expected to use the UPF Node SID label for packets on the interface (e.g., N3 interface between the radio access network 8 and UPF) toward the UPF. The CU may use SRv6. The UPF is expected to use the remaining SR/SRv6 label stack in the packets on the interface (e.g., N6 interface between data network and UPF) toward the MEC domain fabric router in the EDC (e.g., MEC domain fabric router 202C of FIG. 2), which may then process the segment routing label stack and send the packets upstream toward the MEC domain fabric.

Controller 23 communicates the EC node identity to the Application Workload Distribution Controller (AWDC) 420. This allows the AWDC 420 to activate application specific workload worker(s) on the compute infrastructure of the selected EC node.

Controller 23 communicates the downlink segment routing label stack to the selected EC node or to the EC Network Controller 430 (e.g., an SDN controller responsible for networking in the EC compute container/pod). The EC node networking stack (running on the compute OS itself or on the SmartNIC, or on the EC networking fabric) may support segment routing or segment routing IPv6.

The EC networking stack is expected to insert the received segment routing label stack into packets going in the downlink direction toward the MEC domain fabric. The nodes of the MEC domain fabric, including the MEC domain fabric router in the EDC, may process the packets in accordance to the segment routing label stack carried in the packets and deliver packets to the corresponding UPF in the associated EDC. The UPF is expected to receive segment routing packets on the interface (e.g., N6 interface between the data network and UPF), process the label stack, insert the CU Node SID label and send the packets on the interface (e.g., N3 interface between radio access network 8 and UPF) toward the CU. The CU is expected to receive the segment routing packets, discard the label stack and process the packets in accordance with the downlink procedures toward the DU or remote radio head (RRH).

The effect of the above procedure is the programming of an optimized edge routing path from the UE to the Edge Compute workload based on the traffic class requirements of the corresponding application. The above procedure provides a mapping between the 5G QFI for the UE by the mobile network operator policy control function and the traffic class that needs to be transported in the EDC/packet/optical network (the MEC domain Fabric) on an optimized path computed by controller 23 within the MEC domain. This procedure can be repeated for any required QFI, for example the QFI associated with the high data rate class (e.g., class 1) or any other defined QFI/Class combination.

Figure 5A:
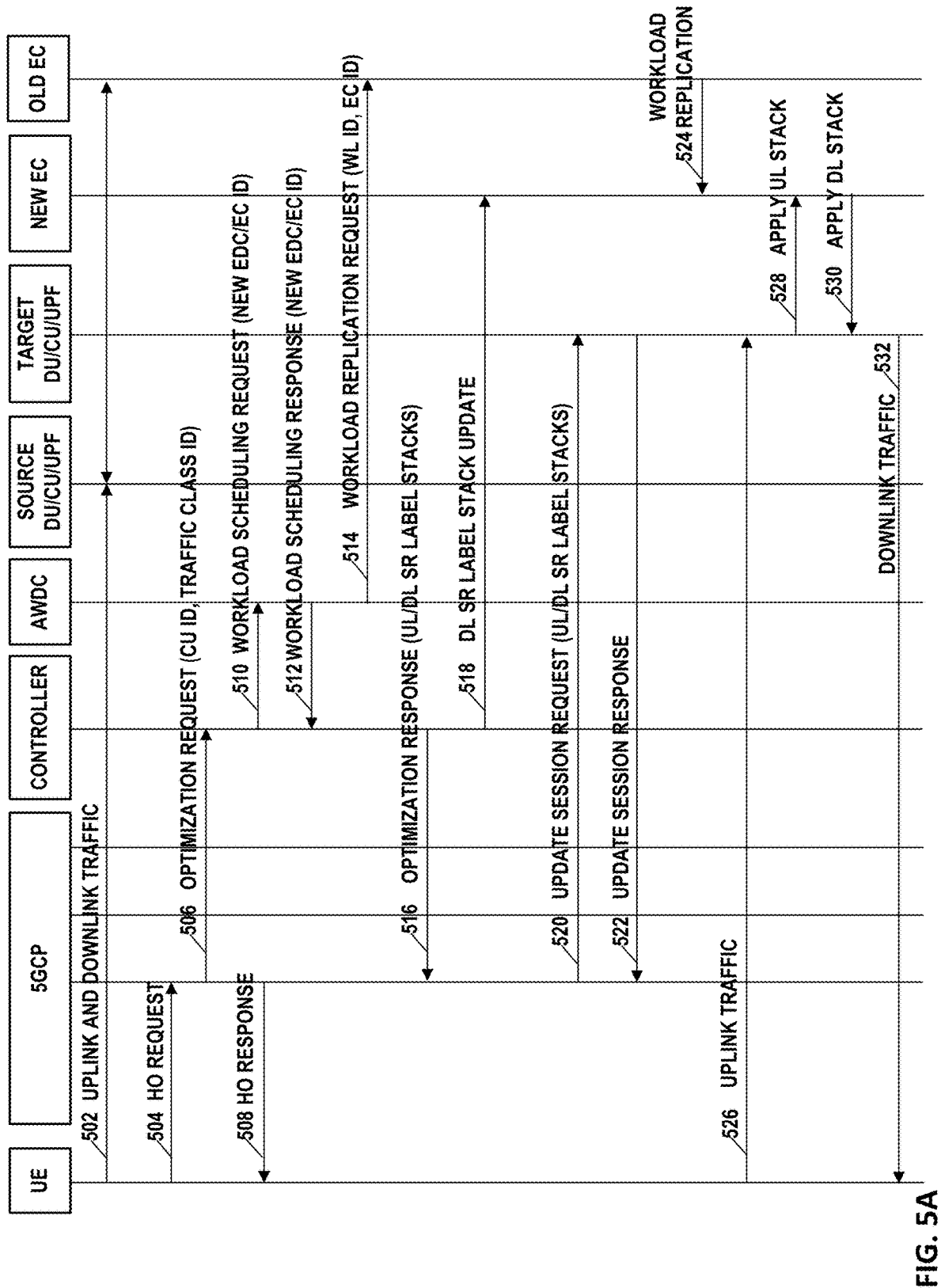
FIGS. 5A-5B are flowcharts illustrating example operations to provide application workload routing network defined edge routing for an application workload within a given MEC domain, in accordance with the techniques described in this disclosure.
Figure 5B:
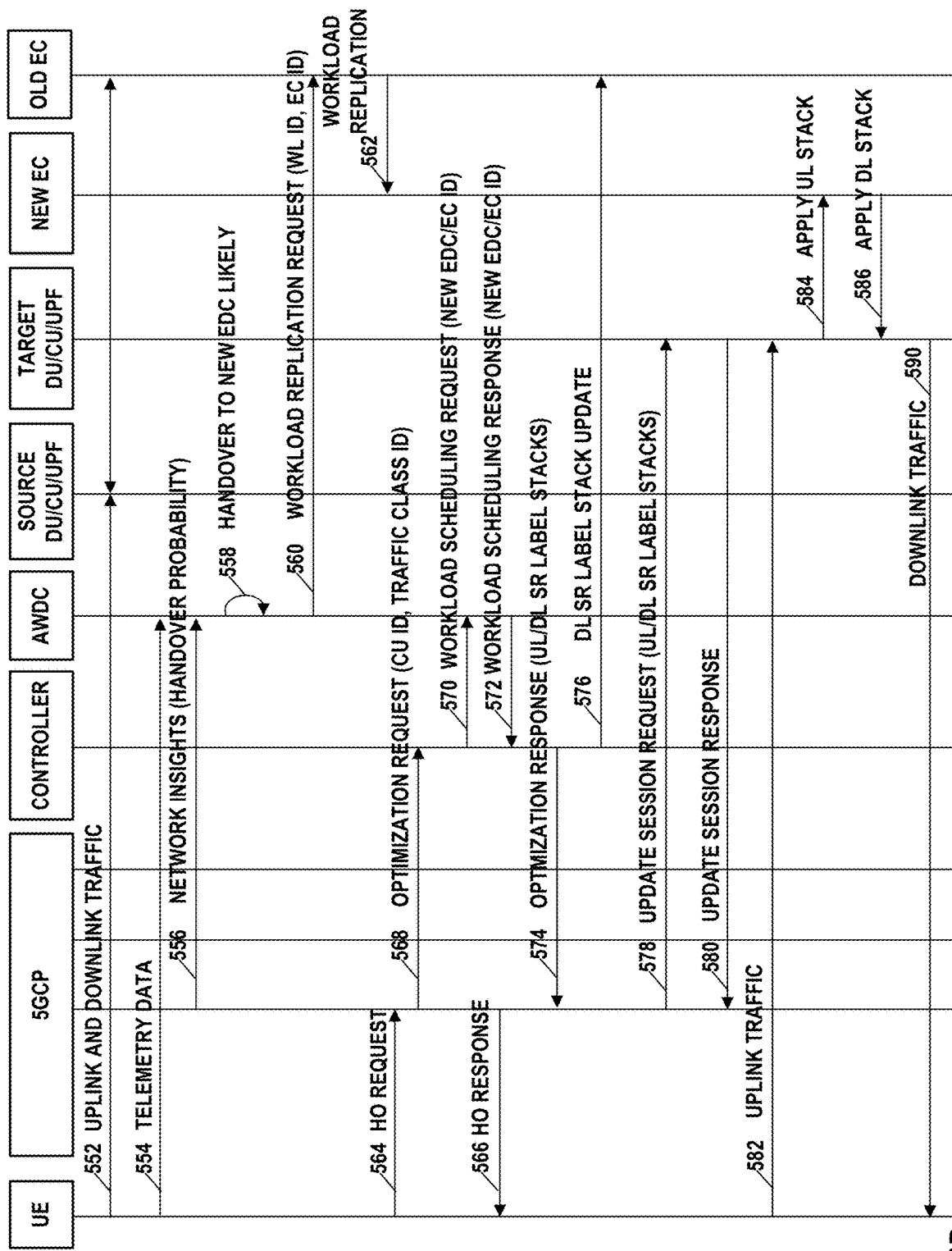

FIGS. 5A-5B are flowcharts illustrating example operations to provide application workload routing within a given MEC domain, in accordance with the techniques described in this disclosure. FIG. 5A may represent an example operation of application workload routing in reactive mode. FIG. 5B may represent an example operation of application workload routing in proactive mode. FIGS. 5A and 5B are described with respect to network 2 of FIG. 1 and the controller interactions illustrated in FIG. 4.

In the example of FIG. 5A, a device 4 may originally send uplink and downlink traffic to compute resources of the original EDC, e.g., DU/CU 24A, UPF 26A of edge data center 22A, which communicate with the original edge compute, e.g., EC 28A (502). Device 4 may perform inter-centralized unit handover (e.g., handover from radio cells aggregated at a given EDC to radio cells aggregated at another EDC). Inter-CU handover results in device 4 attaching to a CU in a different edge data center, e.g., CU 24B in edge data center 22B. For example, device 4 may send a handover request to CU 24B in edge data center 22B (504).

The 5G control plane ("5GCP") (e.g., Network Slice Selection Function) sends a request for an optimized edge routing path to controller 23 (506) and sends a handover response to device 4 (508). For example, the request may include a CU ID and a Traffic Class ID. Controller 23 identifies the new edge data center, identifies one or more paths, and assigns uplink (UL)/downlink (DL) segment routing label stacks. Controller 23 then sends a request for EDC/EC workload scheduling to the Application Workload Distribution Controller 420 (510). For example, the request includes an identifier of the new EDC and/or identifier of the new EC. The Application Workload Distribution Controller 420 sends a workload scheduling response to the 5GCP including the EDC/EC identifier (512).

Application Workload Distribution Controller 420 sends an application workload replication request to the original EC, e.g., EC 28A (514). Controller 23 then sends a response to the request for an optimized edge routing path to 5GCP (516). The request may include segment routing label stacks (e.g., uplink/downlink segment routing stacks) of one or more paths to the new EDC/EC. Controller 23 may send the downlink segment routing label stacks to the new EC (518). 5GCP may send an update session request to compute resources of the new EDC, e.g., EDC 22B (520). The update session request may include the uplink and/or downlink segment routing label stacks. In response to receiving the update session request, the compute resources of the new EDC may send a update session response to 5GCP (522).

The original EC, e.g., EC 28A, may move or replicate the application workload to the new EC, e.g., EC 28B (524). In this way, device 4 sends traffic to the new DU/CU of edge data center 22B (uplink traffic) (538), which applies an uplink label stack (528) to send traffic to the new EC. The new EC may also applies a downlink label stack (530) to send traffic to the compute resources of the new EC, which may then send the traffic to device 4 (532).

In the example of FIG. 5B, a device 4 may originally send uplink and downlink traffic to compute resources of the original EDC, e.g., DU/CU 24A, UPF 26A of edge data center 22A, which communicate with the original edge compute, e.g., EC 28A (552). In this example, controller 23 may determine whether inter-CU handover may occur. For example, Application Workload Distribution Controller 420 may receive telemetry data from device 4 (554) and/or receive network insights from functions of 5GCP (556). In response to receiving the telemetry data and/or network insights, Application Workload Distribution Controller 420 may determine whether inter-CU handover is likely to occur (558). In some examples, Application Workload Distribution Controller 420 includes an AI/ML engine to determine whether handover is likely to occur. In response to determining that handover is likely to occur, Application Workload Distribution Controller 420 sends an application workload replication (or move) request to the original EC, e.g., EC 28A (560), which in turn moves or replicates the application workload to the new EC, e.g., EC 28B (562).

Device 4 may then perform inter-centralized unit handover (e.g., handover from radio cells aggregated at a given EDC to radio cells aggregated at another EDC). For example, device 4 may send a handover request to CU 24B in edge data center 22B (564).

The 5G control plane (e.g., NSSF) sends a request for an optimized edge routing path to controller 23 (568) and sends a handover response to device 4 (566). For example, the request may include a CU ID and a Traffic Class ID. Controller 23 identifies the new edge data center, identifies one or more paths, and assigns uplink (UL)/downlink (DL) segment routing stacks. Controller 23 then sends a request for EDC/EC workload scheduling to the Application Workload Distribution Controller 420 (570). For example, the request includes an identifier of the new EDC and/or EC. The Application Workload Distribution Controller 420 sends a workload scheduling response to the 5GCP including the EDC/EC identifier (572).

Controller 23 sends a response to the request for an optimized edge routing path to 5GCP (574). The request may include segment routing label stacks of one or more paths to the new EDC/EC. Controller 23 may send the downlink segment routing label stacks to the new EC (576). 5GCP may send an update session request to compute resources of the new EDC, e.g., EDC 22B (578). The session request update may include the uplink and/or downlink segment routing label stacks. In response to receiving the session request update, the compute resources of the new EDC may send a response to 5GCP (580). In this way, device 4 sends traffic to the new DU/CU of edge data center 22B (uplink traffic) (582), which applies an uplink label stack (584) to send traffic to the new EC. The new EC may also apply a downlink label stack (586) to send traffic to the compute resources of the new EC, which may then send the traffic to device 4 (590).

Further examples of using segment routing to compute paths within the MEC domain that meet traffic class requirements is further described in U.S. application Ser. No. 16/949,063, entitled "NETWORK DEFINED EDGE ROUTING FOR AN APPLICATION WORKLOAD," filed Oct. 12, 2020, which is incorporated above.

Figure 6:
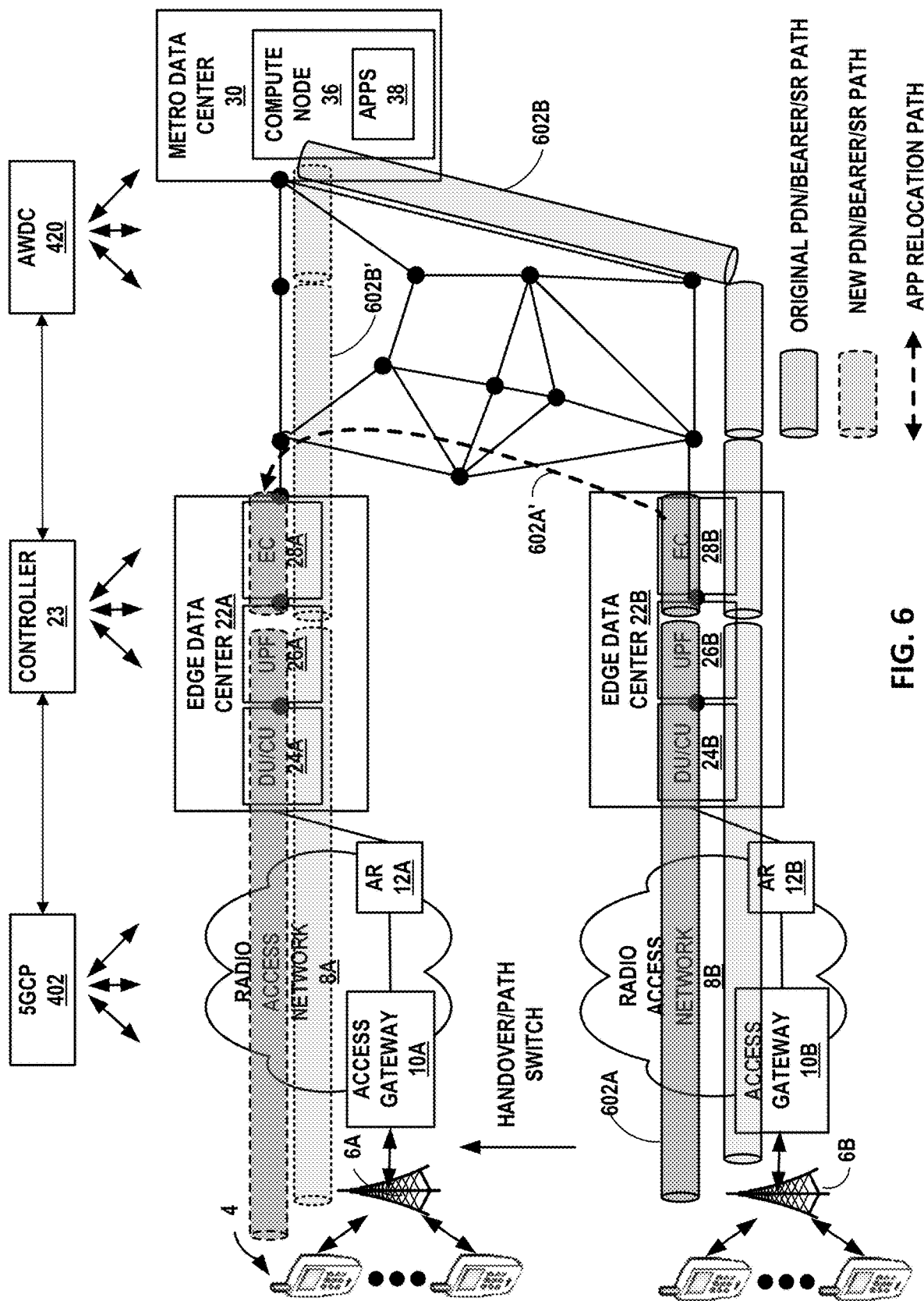
FIG. 6 is a block diagram illustrating an example in which packets from the same packet data network (PDN) session mapped to different bearers corresponding to different QFI values may be assigned different segment routing label stacks in the MEC domain, and routed to different EC resources.

FIG. 6 is a block diagram illustrating an example in which packets from the same packet data network (PDN) session mapped to different 5GC bearers (e.g., tunnels used to connect device 4 to PDNs such as the Internet) corresponding to different QoS Flow Identifier (QFI) values may be assigned different segment routing label stacks in the MEC domain, and routed to different edge compute resources. Bearers, such as bearers 602A and 602B, are tunnels used to connect user equipment to PDNs, such as the internet.

In the example of FIG. 6, Session Management Function (SMF) of controller 23 may, for the same user equipment, e.g., device 4, map the same PDN session to a first 5GC bearer 602A and a second 5GC bearer 602B. For example, for device 4, a first 5G QFI on the first 5GC bearer 602A can be mapped to a first segment routing label stack for routing to an edge compute resource located closer to the user equipment radio attachment point, e.g., edge data center 22B of FIG. 1 (e.g., bearer 602A, QFI A, SR label stack A), while a second 5G QFI value on the second 5GC bearer 602B can be mapped to a second segment routing label stack for routing traffic to a central edge compute resource, e.g., metro data center 30 of FIG. 1 (e.g., bearer 602B, QFI B, SR label stack B). In other words, different segment routing label stacks can be used for each tunnel.

In some examples, device 4 may perform an inter-CU handover and Application Workload Distribution Controller 420 performs application workload routing within the Edge Computing environments in the EDCs (e.g., to replicate or move the application on metro data center 30 to an edge compute of an EDC), in accordance with the disclosed techniques. In these examples, packets from the same PDN session mapped to different 5GC bearers (e.g., 602A' and 602B') corresponding to different QFI values may be assigned different segment routing label stacks in the MEC domain, and routed to different edge compute resources. For example, following the application workload replication or move, a new 5G QFI on the new 5GC bearer 602A' can be mapped to a new segment routing label stack for routing to an edge compute resource located closer to the user equipment radio attachment point, e.g., edge data center 22A of FIG. 1 (e.g., bearer 602A', QFI A', SR label stack A'), while a new 5G QFI value on the new 5GC bearer 602B' can be mapped to a new segment routing label stack for routing traffic to the central edge compute resource, e.g., metro data center 30 of FIG. 1 (e.g., bearer 602B', QFI B', SR label stack B'). In other words, different segment routing label stacks can be used for each tunnel.

Figure 7:
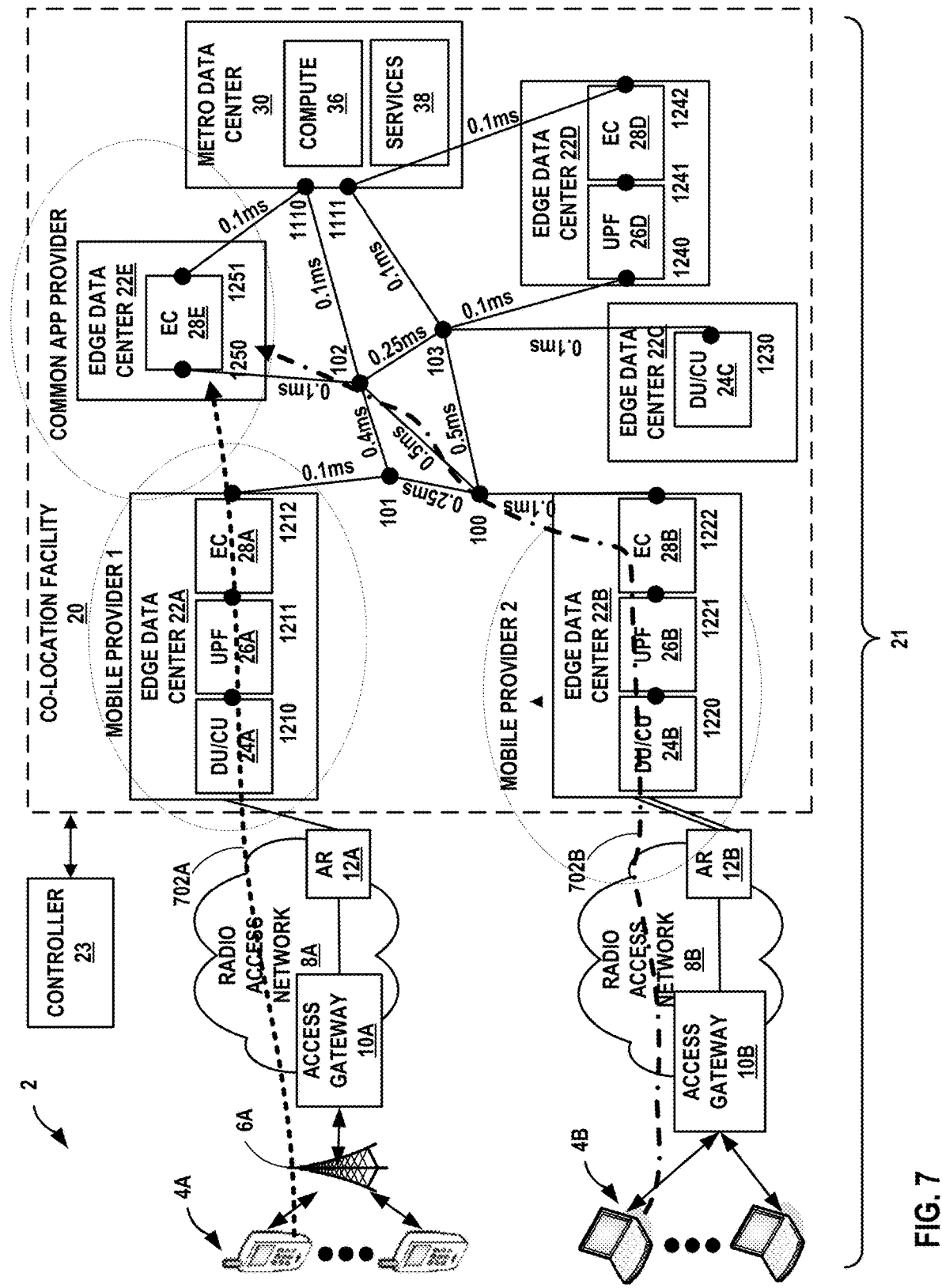
FIG. 7 is a block diagram illustrating an example network providing application workload interworking, in accordance with the techniques described in this disclosure.

FIG. 7 is a block diagram illustrating an example network providing application workload interworking, in accordance with the techniques described in this disclosure. Network system 2 of FIG. 7 may represent network system 2 of FIG. 1, except as described below.

In the example of FIG. 7, EDC 22A is provided by a first Mobile Network Provider ("MNP1" or "mobile provider 1"). EDC 22B is provided by a second Mobile Network Provider ("MNP2" or "mobile provider 2"). In this example, all elements shown within the EDCs are under the control of the respective mobile network providers. This includes the RAN functions, 5GC and EC.

Devices 4A and 4B may make use of different mobile networks provided by different mobile network providers, such as MNP1 and MNP2, respectively. In this example, devices 4 may make use of common edge compute resources to coordinate application processing for applications that require sharing of information across multiple network providers. For example, devices 4A and 4B may both use edge computing function 28E in edge data center 22E provided by an application provider that is common to mobile provider 1 and mobile provider 2 (referred to herein as "common application provider").

In accordance with the techniques described in this disclosure, network system 2 provides a network that ensures that the uplink and downlink traffic from devices 4 for the application are routed to the common application workloads within the network performance constraints (e.g., latency, data rate, reliability) imposed by the application, and ensures the above behavior under mobility conditions.

For example, to ensure that the uplink and downlink traffic from devices 4 for the application is routed to the common application workloads within the network performance constraints, the traffic class definition may include indicators showing that the class must use specific or even well-known application resources or IDs. For example, a segment routing Prefix SID may be used as an application ID. This SID may also be expressed as a SRv6 128-bit address. Moreover, Edge Compute (EC) element registration may include indicators showing that a specific or a well-known application is present in the EC workloads. Additionally, the application itself may be associated with specific segment routing labels (Prefix IDs) or segment routing Anycast SIDs. This is for the application identification and resiliency purposes.

Controller 23 may use the indicators to compute respective paths for each of devices 4 operating in different mobile provider networks. As described in this disclosure, controller 23 may compute the respective paths mapped to a traffic class to route traffic for the application workload between the devices and edge computing function 22E hosting the common application workload. For example, controller 23 may compute path 702A mapped to a traffic class, based on element registration information and routing metrics, to route traffic between device 4A and EC 22E via one or more modules hosted on edge data center 22A (e.g., CU/DU 24A, UPF 26A). Similarly, controller 23 may compute path 702B mapped to the traffic class, based on element registration information and routing metrics, to route traffic between device 4B and EC 22E via one or more modules hosted on edge data center 22B (e.g., CU/DU 24B, UPF 26B).

Figure 8:
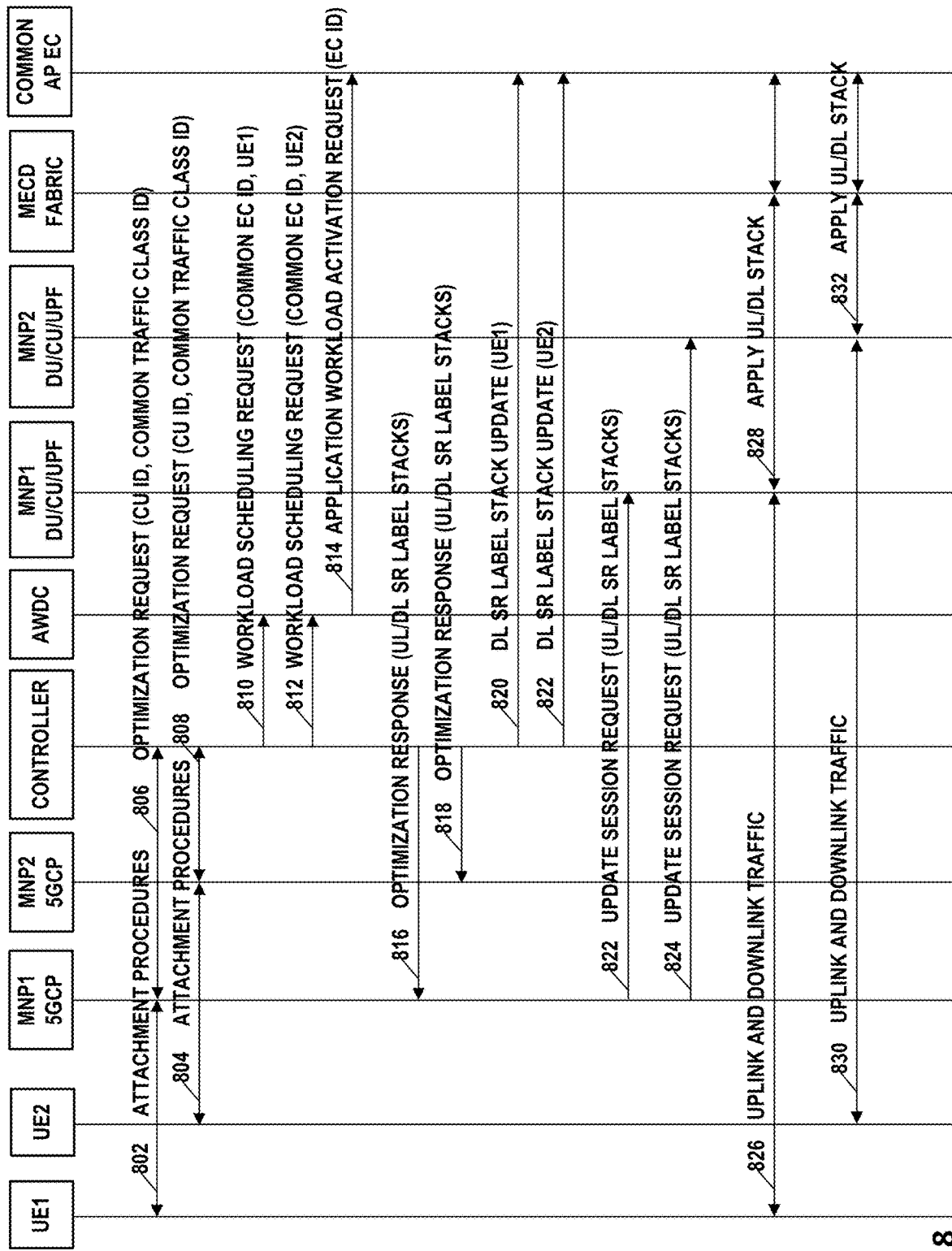
FIG. 8 is a flowchart illustrating an example operation of application workload interworking, in accordance with the techniques described in this disclosure.

FIG. 8 is a flowchart illustrating an example operation of application workload interworking, in accordance with the techniques described in this disclosure. For ease of illustration, FIG. 8 is described with respect to network 2 of FIG. 7.

In the example of FIG. 8, device 4A (e.g., user equipment 1) may perform attachment procedures to 5GC of mobile network provider 1 (802). Similarly, device 4B (e.g., user equipment 2) may perform attachment procedures to 5GC of mobile network provider 2 (804). The 5GC of mobile network provider 1 sends a request for optimized edge routing to controller 23 (806). For example, the request may include a CU identifier and a Common Traffic Class identifier. Similarly, the 5GC of mobile network provider 2 sends a request for optimized edge routing to controller 23 (808). For example, the request may include a CU identifier and a Common Traffic Class identifier. The Common Traffic Class identifier may identify a common traffic class for traffic for the application workload hosted on edge data center 22E. In this way, controller 23 may determine that traffic from device 4A and traffic from device 4B are to be routed to the application workload hosted by an edge computing function 28E provided by a common application provider to mobile provider 1 and mobile provider 2.

In response to receiving the requests from the 5GC of the mobile network provider 1, controller 23 may send a scheduling request to the Application Workload Distribution Controller (AWDC) (810). For example, the workload scheduling request may include a common EC identifier and an identifier of device 4A). Similarly, in response to receiving the requests from the 5GC of the mobile network provider 2, controller 23 may send a scheduling request to the Application Workload Distribution Controller (AWDC) (812). For example, the workload scheduling request may include a common EC identifier and an identifier of device 4B). The AWDC may also send an application workload activation request to the edge computing function (e.g., EC 22E) hosting the application workload provided by the common application provider (814). The application workload activation request may include the identifier of the edge compute of the common edge data center, e.g., EC 28E of EDC 22E.

Controller 23 sends a response for optimized edge routing to the 5GC of mobile network provider 1 (816). For example, the response may include an uplink/downlink segment routing label stack. Similarly, controller 23 sends a response for optimized edge routing to the 5GC of mobile network provider 2 (818). For example, the response may include an uplink/downlink segment routing label stack.

Controller 23 may send a downlink segment routing label stack update for device 4A traffic to EC 28E (820). Similarly, controller 23 may send a downlink segment routing label stack update for device 4B traffic to EC 28E (822).

The 5GC of mobile network provider 1 sends an update session request to the DU/CU or UPF of mobile network provider 1 (822). For example, the update session request may include an uplink/downlink segment routing label stack. Similarly, the 5GC of mobile network provider 2 sends an update session request to the DU/CU or UPF of mobile network provider 2 (824). For example, the update session request may include an uplink/downlink segment routing label stack.

In this way, when device 4A sends traffic to the DU/CU or UPF of mobile network provider 1 (826), the DU/CU or UPF of mobile network provider 1 may send the traffic including the segment routing label stack received from the 5GC of mobile network provider 1 (e.g., update session request in step 822) (828). Similarly, when device 4B sends traffic to the DU/CU or UPF of mobile network provider 2 (830), the DU/CU or UPF of mobile network provider 2 may send the traffic including the segment routing label stack received from the 5GC of mobile network provider 2 (e.g., update session request in step 824) (832).

Figure 9:
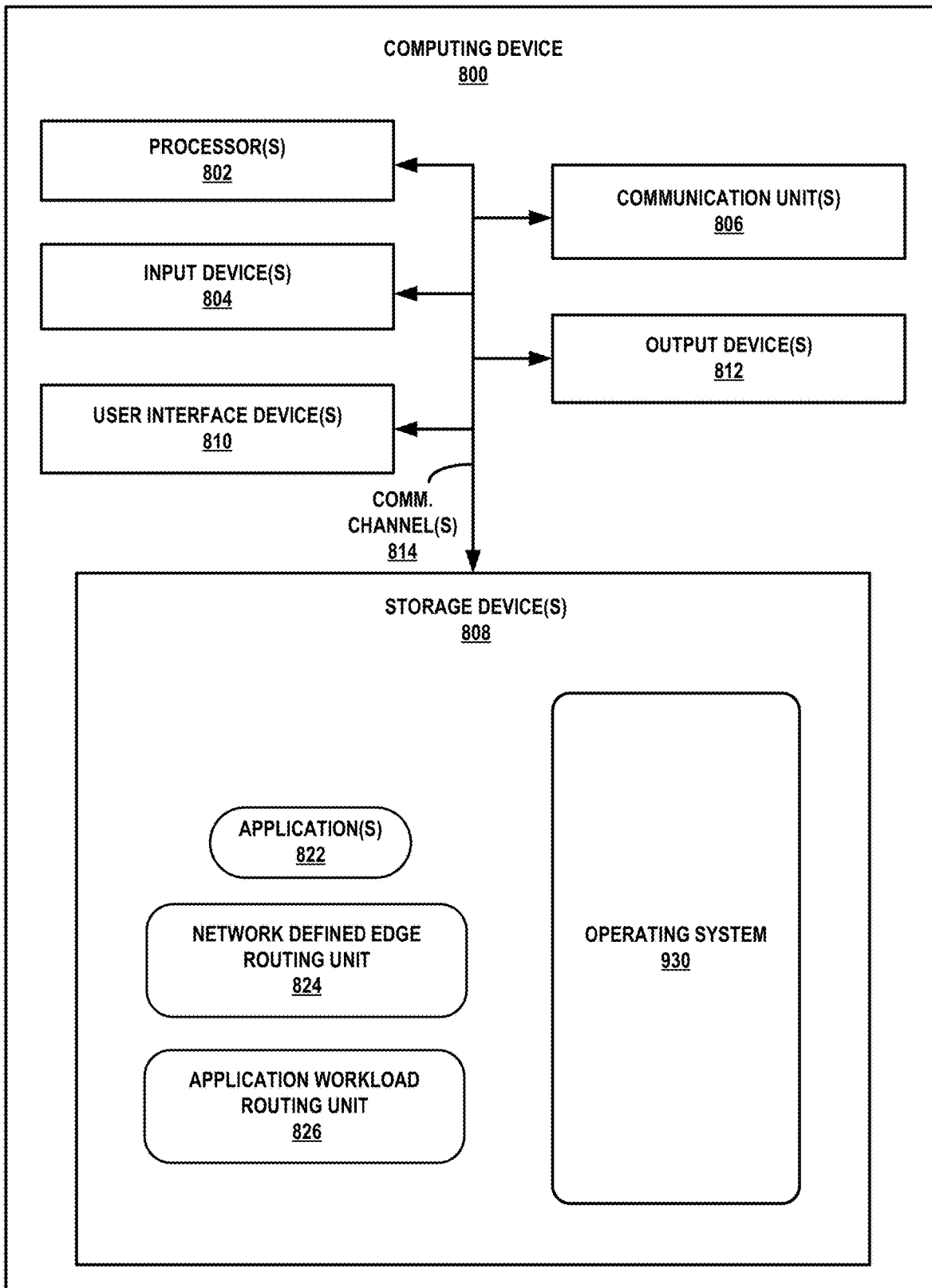
FIG. 9 is a block diagram illustrating further details of one example of a computing device that operates in accordance with one or more techniques of the present disclosure.

FIG. 9 is a block diagram illustrating further details of one example of a computing device that operates in accordance with one or more techniques of the present disclosure. FIG. 8 may illustrate a particular example of a server or other computing device that includes one or more processor(s) 802 for executing a controller (e.g., controller 23 of FIGS. 1-8 and/or Application Workload Distribution Controller 420 of FIG. 4), or any other computing device described herein. Other examples of computing device 900 may be used in other instances. Although shown in FIG. 8 as a stand-alone computing device 900 for purposes of example, a computing device may be any component or system that includes one or more processors or other suitable computing environment for executing software instructions and, for example, need not necessarily include one or more elements shown in FIG. 8 (e.g., communication units 906; and in some examples components such as storage device(s) 908 may not be co-located or in the same chassis as other components).

As shown in the example of FIG. 8, computing device 900 includes one or more processors 802, one or more input devices 904, one or more communication units 906, one or more output devices 912, one or more storage devices 908, and user interface (UI) device(s) 910. Computing device 900, in one example, further includes one or more application(s) 922, Network Defined Edge Routing Unit 924, and operating system 930 that are executable by computing device 900. Each of components 902, 904, 906, 908, 910, and 912 are coupled (physically, communicatively, and/or operatively) for inter-component communications. In some examples, communication channels 914 may include a system bus, a network connection, an inter-process communication data structure, or any other method for communicating data. As one example, components 902, 904, 906, 908, 910, and 912 may be coupled by one or more communication channels 914.

Processors 802, in one example, are configured to implement functionality and/or process instructions for execution within computing device 900. For example, processors 802 may be capable of processing instructions stored in storage device 908. Examples of processors 802 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 908 may be configured to store information within computing device 900 during operation. Storage device 908, in some examples, is described as a computer-readable storage medium. In some examples, storage device 908 is a temporary memory, meaning that a primary purpose of storage device 908 is not long-term storage. Storage device 908, in some examples, is described as a volatile memory, meaning that storage device 908 does not maintain stored contents when the computer is turned off. Examples of volatile memories include random access memories (RAM), dynamic random access memories (DRAM), static random access memories (SRAM), and other forms of volatile memories known in the art. In some examples, storage device 908 is used to store program instructions for execution by processors 802. Storage device 908, in one example, is used by software or applications running on computing device 900 to temporarily store information during program execution.

Storage devices 908, in some examples, also include one or more computer-readable storage media. Storage devices 908 may be configured to store larger amounts of information than volatile memory. Storage devices 908 may further be configured for long-term storage of information. In some examples, storage devices 908 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 900, in some examples, also includes one or more communication units 906. Computing device 900, in one example, utilizes communication units 906 to communicate with external devices via one or more networks, such as one or more wired/wireless/mobile networks. Communication units 906 may include a network interface card, such as an Ethernet card, an optical transceiver, a radio frequency transceiver, or any other type of device that can send and receive information. Other examples of such network interfaces may include 3G and WiFi radios. In some examples, computing device 900 uses communication unit 906 to communicate with an external device.

Computing device 900, in one example, also includes one or more user interface devices 910. User interface devices 910, in some examples, are configured to receive input from a user through tactile, audio, or video feedback. Examples of user interface devices(s) 910 include a presence-sensitive display, a mouse, a keyboard, a voice responsive system, video camera, microphone or any other type of device for detecting a command from a user. In some examples, a presence-sensitive display includes a touch-sensitive screen.

One or more output devices 912 may also be included in computing device 900. Output device 912, in some examples, is configured to provide output to a user using tactile, audio, or video stimuli. Output device 912, in one example, includes a presence-sensitive display, a sound card, a video graphics adapter card, or any other type of device for converting a signal into an appropriate form understandable to humans or machines. Additional examples of output device 912 include a speaker, a cathode ray tube (CRT) monitor, a liquid crystal display (LCD), or any other type of device that can generate intelligible output to a user.

Computing device 900 may include operating system 916. Operating system 916, in some examples, controls the operation of components of computing device 900. For example, operating system 916, in one example, facilitates the communication of one or more applications 922, Network Defined Edge Routing Unit 924, Application Workload Routing Unit 926 with processors 902, communication unit 906, storage device 908, input device 904, user interface devices 910, and output device 912.

Network Defined Edge Routing Unit 924 may include a Segment Routing-Aware Network Software Stack (e.g. a virtual switch) or be realized on a SR-Aware Smart Network Interface Card (NIC). Network Defined Edge Routing Unit 924 may include program instructions and/or data that are executable by computing device 900 to perform the functions as described herein (e.g., the functions as described in FIGS. 1-7). For example, Network Defined Edge Routing Unit 924 may include instructions that cause processor(s) 902 of computing device 900 to receive, via communication unit(s) 906, element registration information for each of the modules hosted on the set of interconnected edge data centers and for one or more network devices that interconnect the modules in the network. Network Defined Edge Routing Unit 924 may also include instructions that cause processor(s) 902 of computing device 900 to obtain one or more routing metrics of the network, such as, for example, by using network performance measurement protocols (e.g., OWAMP, TWAMP, SNMP, etc.) to obtain routing metrics such as latency, bandwidth, hop count, link utilization, reliability, throughput, load, packet loss, etc. Network Defined Edge Routing Unit 924 may further include instructions that cause processor(s) 902 of computing device 900 to compute, based on the element registration information and the one or more routing metrics, one or more paths mapped to respective traffic classes to route traffic via the set of interconnected edge data centers. For example, Network Defined Edge Routing Unit 924 may perform traffic engineering using segment routing mechanisms (e.g., SPRING) to compute segment routing label stacks mapped to respective traffic classes to route traffic within the MEC domain of the network. Network Defined Edge Routing Unit 924 may also include instructions that cause processor(s) 902 of computing device 900 to receive a request to route traffic according to a traffic class of the respective traffic classes from a source edge data center of the set of interconnected edge data centers to a destination edge data center of the set of interconnected edge data centers. For example, computing device 900 may receive a request via communication unit(s) 906 and in response to receiving the request to route traffic according to the traffic class, send, via output device(s) 912, a response to the set of interconnected edge data centers that specifies a path of the one or more paths that is mapped to the traffic class to cause the set of interconnected edge data centers to route traffic according to the traffic class.

In accordance with the techniques described in this disclosure, Application Workload Routing Unit 926 may include instructions to cause computing device 900 to move or replicate the application workload hosted on an original edge compute (e.g., edge compute 28A) to a different edge compute in a different edge data center that is locally accessible by device 4 (e.g., edge compute 28B of EDC 22B) and route the network traffic to the new edge compute using paths mapped to respective traffic classes within the MEC domain of the network. In these examples, computing device 900 may represent Application Workload Distribution Controller 420 of FIG. 4.

In some examples, Application Workload Routing Unit 926 may include instructions to cause processor(s) 902 of computing device 900 to receive signaling (e.g., a handover request) from 5G Core (5GC) functions (e.g., new CU) in a new EDC that a device has attached to the new CU or has requested to attach to the new CU. In response, the instructions of Application Workload Routing Unit 926 may cause processor(s) 902 of computing device 900 to replicate or move the application workload hosted on an original EC to the new EC. For example, Application Workload Routing Unit 926 may include instructions to cause processor(s) 902 of computing device 900 to send, to the old EC, an application workload replication (or move) request including an application workload identifier and/or an identifier of the new EC, which causes the old EC to replicate its application workload to the new EC.

In some examples, Application Workload Routing Unit 926 may include instructions that cause processor(s) 902 of computing device 900 to receive, via communication unit(s) 906, telemetry data from devices or network insight information from 5GC functions (DU, CU, UPF, etc.) to determine handover probability of the device. Application Workload Routing Unit 926 may include an artificial intelligence/machine learning engine to determine, from the telemetry data and/or network insights, whether inter-CU handover may occur. In the event Application Workload Routing Unit 926 determines that inter-CU handover may occur, Application Workload Routing Unit 926 may include instructions that cause processor(s) 902 of computing device 900 to send an application workload replication request (e.g., application workload identifier and/or EC identifier) to the original edge compute to proactively cause the original edge compute to replicate its application workload to the new edge compute.

Figure 10:
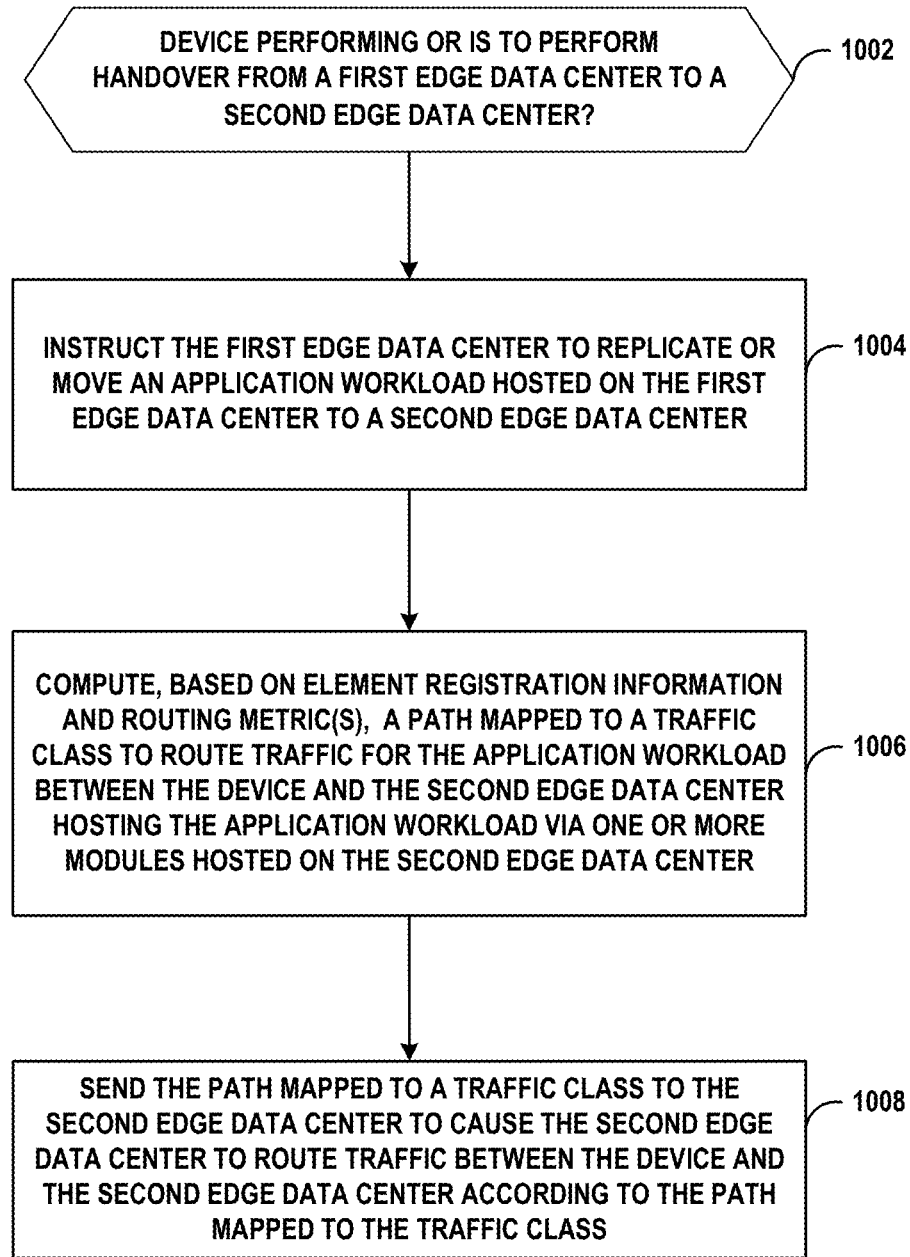
FIG. 10 is a flowchart illustrating an example operation of a controller of the network to provide network defined edge routing for an application workload, in accordance with the techniques described in this disclosure.

FIG. 10 is a flowchart illustrating an example operation of a controller of the network to provide application workload routing, in accordance with the techniques described in this disclosure. For ease of illustration, FIG. 10 is described with respect to network 2 of FIG. 1.

Controller 23 may determine whether device 4 is performing or is to perform inter-CU handover from a first ("original") edge data center (e.g., EDC 22A) to a second ("new") edge data center (e.g., EDC 22B) (1002). For example, controller 23 may determine an inter-CU handover has occurred or is occurring by receiving a signaling message from 5G Core (5GC) functions (e.g., CU 24B) of EDC 22B that device 4 has requested to attach to CU 24B (e.g., handover request) or has attached to CU 24B. Alternatively, or additionally, controller 23 may anticipate whether inter-CU handover may occur based on data learned from the mobile device and/or the mobile network. For example, device 4 may supply telemetry data to controller 23 on its movement pattern, such as location data, direction of travel, etc. In some examples, the mobile network can additionally, or alternatively, provide network data on the approaching handover event for the device. In some examples, controller 23 may include a machine-learning (ML) or artificial intelligence (AI) engine used to predictively determine whether mobile device handover may occur and coordinate the new EC resource location where the application workload is to be replicated or moved.

In response to determining device 4 is performing or is to perform inter-CU handover, controller 23 may instruct a first data center (e.g., EDC 22A) to replicate or move an application workload hosted on the first edge computing function to a second edge data center (e.g., EDC 22B) (1004). For example, controller 23 may receive a signaling message from 5G Core (5GC) functions (e.g., CU 24B) of EDC 22B that device 4 has requested to attach to CU 24B (e.g., handover request) or has attached to CU 24B. In response to determining handover has occurred, controller 23 may replicate or move the application workload hosted on EC 28A of EDC 22A to EC 28B of EDC 22B. Similarly, controller 23 may receive telemetry data (location data and/or location of travel) from device 4 and/or network insights from the mobile network functions (e.g., DU, CU, UPF, etc.) to determine the handover probability. In response to determining handover is likely to occur, controller 23 may instruct a first edge computing function (e.g., EC 22A) of the first edge data center (e.g., EDC 22A) to replicate or move the application workload hosted on the first edge computing function to a second edge computing function (e.g., EC 22B) of the second edge data center (e.g., EDC 22B).

Controller 23 may compute, based on: (1) element registration information for modules hosted on a set of interconnected edge data centers including the first edge data center and the second edge data center, (2) one or more network devices that interconnect the modules in the network, and (3) one or more routing metrics of the network, a path mapped to a traffic class to route traffic between the device and the second edge data center hosting the application workload via one or more modules hosted on the second edge data center (1006). For example, controller 23 may receive element registration information for one or more radio access network (RAN) functions (e.g., DU/CU 24), one or more 5G core functions (e.g., UPF 26), and one or more edge computing functions (e.g., EC 28) for an application workload.

In response to receiving the edge data center (EDC) element registration information, the element inventory module 216 of controller 23 may generate an EDC element registration record for each of the EDCs in the MEC domain. The EDC element registration record may include an identifier for a particular EDC and segment routing identifiers (e.g., node SIDs) assigned to the registered elements within the EDC. For example, controller 23 includes an element inventory module 216 that assigns segment routing segment identifiers (e.g., node SID) for each of the registered elements.

Controller 23 may also obtain one or more routing metrics of the network. For example, controller 23 may obtain metrics such as latency, bandwidth, hop count, link utilization, reliability, throughput, load, packet loss, etc. Controller 23 may also identify path parameters of the interconnection fabric 20, such as span latencies, capacity (i.e., bandwidth), protection state, and others.

Based on the element registration information and the one or more routing metrics, controller 23 computes one or more paths mapped to respective traffic classes to route traffic via the set of interconnected edge data centers. For example, controller 23 may include topology module 212 that is responsible for topology discovery of MEC domain 21, path computation module 214 to compute paths within the MEC domain, and segment routing module 218 for segment routing label assignments (as described above). The topology module 212 of controller 23 may, for example, use routing protocols (e.g., Border Gateway Protocol (BGP), Interior Gateway Protocol (IGP) or other routing protocols) to determine the topology of the interconnection fabric 20. The path computation module 214 of controller 23 may compute paths that meet traffic class requirements. For example, path computation module 214 of controller 23 may collect network fabric path information based on the link and routing metrics between the packet and optical domains. Using the EDC element registration record and the collected link and routing metrics, path computation module 214 of controller 23 may compute paths within the MEC domain that meet expected performance bounds. For example, path computation module 214 of controller 23 may use, for example, Constrained Shortest Path First (CSPF) or other path computation algorithms. The paths may be defined by a stack of labels (e.g., segment identifiers) from EDC element registration record. Path computation module 214 of controller 23 may also generate a traffic class mapping structure that maps traffic classes (e.g., low latency class or high data rate class) to one or more computed paths contained within expected performance bounds and within the MEC domain. For example, path computation module 214 of controller 23 may define traffic classes, each including one or more paths defined by a label stack of segment identifiers from the EDC element registration record.

Controller 23 computes, based on the element registration information and one or more routing metrics, a path mapped to a traffic class to route traffic for the application workload between the device (e.g., device 4) and the second edge computing function hosting the application workload (e.g., EC 22B) via one or more modules hosted on the second edge data center (e.g., CU/DU 24B, UPF 26B).

Controller 23 sends the computed path that is mapped to a traffic class to cause the second edge data center (e.g., edge data center 22B) to route traffic for the application workload according to the path mapped to the traffic class (1008). For example, controller 23 sends uplink (UL)/downlink (DL) segment routing stacks to the 5G control plane such that the 5G control plane may send an update session request including the uplink/downlink segment routing stacks to modules hosted in the new edge data center (e.g., CU/DU 24B, UPF 26B). In this way, when the modules hosted in the new edge data center receive traffic for the application workload, the modules may apply the uplink segment routing stack to route the traffic to the new edge compute. Controller 23 may also send downlink segment routing stack to the new edge compute such that the new edge compute may apply the downlink segment routing stack to route traffic to the device.

The techniques described herein may be implemented in hardware, software, firmware, or any combination thereof. Various features described as modules, units, elements or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following examples.

What is claimed is:

1. A method comprising:
   in response to determining that a device is performing or is to perform handover from a first edge data center to a second edge data center, instructing, by a controller of a network, the first edge data center to replicate or move an application workload hosted on the first edge data center to the second edge data center,
   computing, by the controller and based on: (1) element registration information for modules hosted on a set of interconnected edge data centers including the first edge data center and the second edge data center, (2) one or more network devices that interconnect the modules in the network, and (3) one or more routing metrics of the network, a path mapped to a traffic class to route traffic between the device and the second edge data center hosting the application workload via one or more modules hosted on the second edge data center; and
   sending, by the controller, the path to the second edge data center to cause the second edge data center to route traffic for the application workload according to the path mapped to the traffic class.

2. The method of claim 1, wherein each of the modules hosted on the set of interconnected edge data centers provides at least one of a radio access network (RAN) function, a $5^{th}$ Generation of Mobile Networks (5G) core function, and an edge computing function.

3. The method of claim 1, wherein determining that the device is performing handover comprises:
   receiving a signaling message from the second edge data center that the device has attached or has requested to attach to the second edge data center instead of the first edge data center; and
   determining, based on the signaling message received from the second edge data center, that the device is performing handover.

4. The method of claim 1, wherein determining that the device is to perform handover comprises:
   receiving telemetry data about the device, wherein the telemetry data comprises at least one of a location of the device and direction of travel of the device; and
   determining, based on the telemetry data, that the device is to perform handover.

5. The method of claim 4, further comprising:
   receiving, from the one or more modules of the second edge data center, network insight data,
   wherein determining that the device is to perform handover further comprises determining, based on the telemetry data from the device and the network insight data from the modules of the second edge data center, that the device is to perform handover.

6. The method of claim 1, wherein the routing metrics of the network comprises at least one of latency, bandwidth, hop count, link utilization, reliability, throughput, load, packet loss, and path parameters of an optical network, wherein the path parameters of the optical network comprises at least one of span latencies, capacities, and protection states.

7. The method of claim 1, wherein the set of interconnected edge data centers is configured as a domain of the one or more edge computing functions.

8. The method of claim 1, wherein computing the path mapped to the traffic class comprises:
in response to receiving the element registration information, assigning, by the controller, a segment identifier for each of the modules hosted on the second edge data center, and for each of the one or more network devices that interconnect the modules in the network; and
generating, by the controller and from the segment identifiers, one or more segment routing label stacks mapped to the traffic class to route traffic for the application workload between the device and the second edge computing function according to the path mapped to the traffic class.

9. The method of claim 8, wherein the one or more segment routing label stacks comprises an uplink segment routing label stack, wherein sending the path comprises sending the uplink segment routing label stack to the second edge data center to cause a target centralized unit of the second edge data center to encapsulate traffic with the uplink segment routing label stack to route traffic for the application workload from the device to the second edge computing function.

10. The method of claim 8, wherein the one or more segment routing label stacks comprises a downlink segment routing label stack, wherein sending the path further comprises sending the downlink segment routing label stack to the second edge data center to cause the second edge computing function to encapsulate traffic with the downlink segment routing label stack to route traffic for the application workload from the second edge computing function to the device.

11. A controller for a network, comprising:
one or more processors operably coupled to memory, wherein the one or more processors are configured to:
instruct, in response to determining that a device is performing or is to perform handover from a first edge data center to a second edge data center, the first edge data center to replicate or move an application workload hosted on the first edge data center to the second edge data center,
compute, based on: (1) element registration information for modules hosted on a set of interconnected edge data centers including the first edge data center and the second edge data center, (2) one or more network devices that interconnect the modules in the network, and (3) one or more routing metrics of the network, a path mapped to a traffic class to route traffic between the device and the second edge data center hosting the application workload via one or more modules hosted on the second edge data center; and
send the path to the second edge data center to cause the second edge data center to route traffic for the application workload according to the path mapped to the traffic class.

12. The controller of claim 11, wherein each of the modules hosted on the set of interconnected edge data centers provide at least one of a radio access network (RAN) function, a $5^{th}$ Generation of Mobile Networks (5G) core function, and an edge computing function.

13. The controller of claim 11, wherein to determine that the device is performing handover, the one or more processors are configured to:
receive a signaling message from the second edge data center that the device has attached or has requested to attach to the second edge data center instead of the first edge data center; and
determine, based on the signaling message received from the second edge data center, that the device is performing handover.

14. The controller of claim 11, wherein to determine that the device is to perform handover, the one or more processors are configured to:
receive telemetry data about the device, wherein the telemetry data comprises at least one of a location of the device and direction of travel of the device; and
determine, based on the telemetry data, that the device is to perform handover.

15. The controller of claim 14, wherein the one or more processors are further configured to:
receive, from the one or more modules of the second edge data center, network insight data,
wherein to determine that the device is to perform handover, the one or more processors are further configured to determine, based on the telemetry data from the device and the network insight data from the modules of the second edge data center, that the device is to perform handover.

16. The controller of claim 14, wherein to compute the path mapped to the traffic class, the one or more processors are configured to:
assign, based on the element registration information, a segment identifier for each of the modules hosted on the second edge data center, and for each of the one or more network devices that interconnect the modules in the network; and
generate, from the segment identifiers, an uplink segment routing label stack and a downlink segment routing label stack each mapped to the traffic class to route traffic for the application workload between the device and the second edge computing function according to the path mapped to the traffic class;
send the uplink segment routing label stack to the second edge data center to cause a target centralized unit of the second edge data center to encapsulate traffic with the uplink segment routing label stack to route traffic for the application workload from the device to the second edge computing function; and
send the downlink segment routing label stack to the second edge data center to cause the second edge computing function to encapsulate traffic with the downlink segment routing label stack to route traffic for the application workload from the second edge computing function to the device.

17. A method comprising:
receiving, by a controller of a network, a first request to route traffic between a first device and an edge computing function hosting an application workload via a first edge data center, and a second request to route traffic between a second device and the edge computing function via a second edge data center;
wherein the first edge data center and the second edge data center are each provided by different mobile network providers,
wherein a third edge data center hosting the application workload is provided by a common application provider to the different mobile network providers;

computing, by the controller and based on: (1) element registration information for modules hosted on a set of interconnected edge data centers including the first edge data center, the second edge data center, and the third edge data center (2) one or more network devices that interconnect the modules in the network, and (3) one or more routing metrics of the network, a first path mapped to a traffic class to route traffic between the first device and the edge computing function hosting the application workload via one or more of the modules hosted on the first edge data center, and a second path mapped to the traffic class to route traffic between the second device and the edge computing function hosting the application workload via one or more of the modules hosted on the second edge data center;

sending, by the controller, the first path to the first edge data center to cause the first edge data center to route traffic for the application workload according to the first path mapped to the traffic class; and sending, by the controller, the second path to the second edge data center to cause the second edge data center to route traffic for the application workload according to the second path mapped to the traffic class.

18. The method of claim 17, wherein each of the modules hosted on the set of interconnected edge data centers provide at least one of a radio access network (RAN) function, a $5^{th}$ Generation of Mobile Networks (5G) core function, and an edge computing function.

19. The method of claim 17, wherein the first request and the second request each include a common traffic class identifier.

20. The method of claim 17, further comprising:

in response to receiving the first request and the second request, sending, by the controller, an application workload activation request to the edge computing function hosting the application workload to activate the edge computing function for access by the first device via the first edge data center and the second device via the second edge data center.

* * * * *